US012590485B2

(12) United States Patent
Wei et al.

(10) Patent No.: US 12,590,485 B2
(45) Date of Patent: Mar. 31, 2026

(54) HOUSEHOLD APPLIANCE

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Shuaishuai Wei, Foshan (CN); Yanqi Wu, Foshan (CN); Xinchao Zhu, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 18/689,429

(22) PCT Filed: Jun. 1, 2023

(86) PCT No.: PCT/CN2023/097764
§ 371 (c)(1),
(2) Date: Mar. 6, 2024

(87) PCT Pub. No.: WO2023/232105
PCT Pub. Date: Dec. 7, 2023

(65) Prior Publication Data

US 2025/0137309 A1 May 1, 2025

(30) Foreign Application Priority Data

Jun. 1, 2022 (CN) ......................... 202221380557.9
Jun. 1, 2022 (CN) ......................... 202221392217.8

(51) Int. Cl.
*E05F 5/02* (2006.01)
*F24C 15/02* (2006.01)

(52) U.S. Cl.
CPC ............ *E05F 5/027* (2013.01); *F24C 15/022* (2013.01); *E05Y 2201/47* (2013.01); *E05Y 2600/626* (2013.01); *E05Y 2900/308* (2013.01)

(58) Field of Classification Search
CPC .......... E05F 5/02; E05F 5/027; H05B 6/6417; F24C 15/022; E05Y 2600/626; E05Y 2900/308

(Continued)

(56) References Cited

U.S. PATENT DOCUMENTS 4,341,409 A * 7/1982 Sakoda ................ H05B 6/6417 292/254
5,672,857 A * 9/1997 Frost ...................... H01H 3/161 200/61.81

(Continued)

FOREIGN PATENT DOCUMENTS

CN 205690458 U 11/2016
CN 110958837 A 4/2020

(Continued)

OTHER PUBLICATIONS

Partial supplementary European Search report received in EP Application 23815282.1; mailed Oct. 24, 2024.

(Continued)

*Primary Examiner* — James O Hansen
(74) *Attorney, Agent, or Firm* — K&L Gates LLP

(57) ABSTRACT

Provided is a household appliance, which includes: a support; a door body connected to the support through rotating and provided with a door hook; a buffer assembly mounted at the support. The buffer assembly includes a first elastic driving member, a second elastic driving member, a damper and a driving lever. The driving lever is provided with a connection portion. The first elastic driving member and the second elastic driving member are connected to the connec- (Continued)

tion portion. When the door body is opened, the door hook is disengaged from the driving lever, an angle between the first elastic driving member and a first connecting line ranges from 0 degree to 60 degrees, and an angle between the second elastic driving member and a second connecting line ranges from 0 degree to 60 degrees.

18 Claims, 20 Drawing Sheets

(58) Field of Classification Search
USPC ........................................................ 312/319.2
See application file for complete search history.

(56) References Cited

U.S. PATENT DOCUMENTS

2004/0182856 A1* 9/2004 Lee ........................ F24C 15/022 219/739
2020/0124291 A1 4/2020 Reid

FOREIGN PATENT DOCUMENTS

CN 213272727 U 5/2021
CN 113216776 A 8/2021
CN 113700408 A 11/2021
CN 114016832 A 2/2022
CN 114961445 A 8/2022
CN 217681149 U 10/2022
CN 217681150 U 10/2022
CN 217681152 U 10/2022
CN 115324430 A 11/2022
CN 218092548 U 12/2022
CN 218522472 U 2/2023
DE 202015001071 U1 4/2015
KR 20000050712 A 8/2000
WO 9705428 A1 2/1997

OTHER PUBLICATIONS

The Examination Report received in the counterpart Australian application 2023281744, mailed on Mar. 7, 2025, 4 pages.
The Extended European Search Report received in the counterpart European application 23815282.1, mailed on Jan. 23, 2025, 14 pages.
ISR received in PCT/CN2023/097764; mailed Sep. 19, 2023.
Written Opinion of the ISA for PCT/CN2023/097764; Sep. 19, 2023.
The Notice of Reasons for Refusal received in the counterpart Japanese Application 2024-545134, 10 pages with English translation.
The Notice of Reasons for Refusal received in the counterpart Japanese Application No. 2024-545134, dated Sep. 9, 2025, 6 pages with English translation.
The Notice of Acceptance received in the counterpart CA Application No. 2023281744, dated Nov. 28, 2025, 4 pages.
The Grant Notice received in the counterpart Japanese Application No. 2024-545134, dated Jan. 13, 2026, 6 pages with English translation.
The second office action received in the counterpart EP Application No. 23815282.1, dated Jan. 27, 2026, 7 pages.

* cited by examiner

HOUSEHOLD APPLIANCE

CROSS-REFERENCES TO RELATED APPLICATIONS

The present disclosure is a national phase application of International Application No. PCT/CN2023/097764, filed on Jun. 1, 2023, which claims a priority to Chinese Patent Application No. 202221380557.9 filed on Jun. 1, 2022 and Chinese Patent Application No. 202221392217.8, filed on Jun. 1, 2022, both of which are hereby incorporated by reference in their entireties.

FIELD

The present disclosure relates to the field of electric appliance technologies, and more particular, to a household appliance.

BACKGROUND

In the related art, a household appliance may include a cavity internally having a chamber and a door body connected to the cavity through rotating, to open or close the chamber. To reduce door closing noise, the household appliance is provided with a slow-closing interlocking structure that includes a driving spring. The driving spring, when closing the door, provides an acceleration force to the door body through a driving lever. Therefore, it is necessary to provide a scheme for designing a driving force of the driving spring.

SUMMARY

Embodiments of the present disclosure provide a household appliance.

According to one embodiment of the present disclosure, a household appliance is provided. The household appliance includes: a support; a door body connected to the support through rotating and provided with a door hook; and a buffer assembly mounted at the support and including a first elastic driving member, a second elastic driving member, a damper, and a driving lever, the damper being movably connected to the driving lever, the driving lever being provided with a connection portion, and the first elastic driving member and the second elastic driving member being connected to the connection portion. When the door body is opened, the door hook is disengaged from the driving lever. An angle between the first elastic driving member and a first connecting line ranges from 0 degree to 60 degrees, and an angle between the second elastic driving member and a second connecting line ranges from 0 degree to 60 degrees. The first connecting line is between a rotation center of the driving lever and a first connection between the first elastic driving member and the connection portion. The second connecting line is between the rotation center of the driving lever and a second connection between the second driving elastic portion and the connection portion. When the door body is closed, the door hook is abutted against the driving lever and the driving lever presses the damper.

In the household appliance, when the door body is opened, an angle range between the first elastic driving member and the second elastic driving member, and a target connecting line is set. Therefore, two elastic driving members can provide an appropriate driving force during the closing of the door body, and the door body can be closed smoothly.

In some embodiments, an angle between the first elastic driving member and the second elastic driving member ranges from 7 degrees to 110 degrees when the door body is opened.

In some embodiments, a combined force of the first elastic driving member and the second elastic driving member on the driving lever acts above the rotation center of the driving lever when the door body is opened. The combined force of the first elastic driving member and the second elastic driving member on the driving lever acts below the rotation center of the driving lever when the door body is closed.

In some embodiments, when the door body is opened, the first elastic driving member applies torque for rotating the driving level in a first direction to the driving lever with a tangential component force of the first elastic driving member, and the second elastic driving member applies torque for rotating the driving level in a second direction to the driving lever with a tangential component force of the second elastic driving member, the second direction being opposite to the first direction. The torque applied by the first elastic driving member is greater than the torque applied by the second elastic driving member.

In some embodiments, when the door body is closed, the first elastic driving member applies torque for rotating the driving level in a second direction to the driving lever with a tangential component force of the first elastic driving member, and the second elastic driving member applies torque for rotating the driving level in the second direction to the driving lever with a tangential component force of the second elastic driving member. The torque applied by the second elastic driving member is greater than the torque applied by the first elastic driving member.

In some embodiments, the support is provided with a switch. The buffer assembly further includes a rotating lever rotatably connected to the support. When the door body is closed, the door hook is abutted against the rotating lever to trigger the switch by the rotating lever.

In some embodiments, the rotating lever includes a rotating arm rotatably connected to the support and a contact arm connected to the rotating arm, the contact arm being configured to trigger the switch. The support has a groove, the contact arm being at least partially located in the groove.

In some embodiments, the driving lever includes a first arm and a second arm spaced apart from each other. The door hook is configured to move, during the closing of the door body, through the second arm below the second arm to be abutted against the first arm, driving the driving lever to rotate. The contact arm is provided with a protruding post. The first arm has a notch and configured to avoid the protruding post by means of the notch during the closing of the door body.

In some embodiments, the support is further provided with a block blocking at least a part of the rotating arm.

In some embodiments, the door hook has an end having a first guide surface. The driving lever includes a first arm and a second arm spaced apart from each other, the second arm having a second guide surface at a side of the second arm. During the closing of the door body, the first guide surface is cooperatively connected to the second guide surface to allow the door hook to be caught by the second arm after an end of the door hook moves through the second arm.

According to one embodiment of the present disclosure, a household appliance is provided. The household appliance includes: a support; a door body connected to the support through rotating and provided with a door hook; and a buffer assembly mounted at the support and including a restorable damper and a driving lever rotatably connected to the support, the damper including a body fixed at the support and a rod movably connected to the body. When the door body is closed, the door hook is abutted against the driving lever to press the rod. When the door body is opened, the door hook is disengaged from the driving lever, and the damper is in a natural length state. A gap is formed between the rod and the driving lever.

In the above household appliance, the restorable damper is adopted, and the damper and the driving lever are no longer linked. Thus, a rocking block can be omitted, which reduces using components and simplifying a motion process.

In some embodiments, the support has a receiving groove, the body being at least partially fixed at the receiving groove.

In some embodiments, the support is provided with a limit post, the limit post being configured to be abutted against the driving lever and limit a rotation of the driving lever when the door body is closed.

In some embodiments, the support is provided with a switch. The buffer assembly further includes a rotating lever rotatably connected to the support. When the door body is closed, the door hook is abutted against the rotating lever to trigger the switch by the rotating lever.

In some embodiments, the rotating lever includes a rotating arm rotatably connected to the support and a contact arm connected to the rotating arm. The support has a groove, the contact arm being at least partially located in the groove. The contact arm is configured to trigger the switch.

In some embodiments, the driving lever includes a first arm and a second arm spaced apart from each other. The door hook is configured to move, during the closing of the door body, through the second arm below the second arm to be abutted against the first arm, driving the driving lever to rotate. The contact arm is provided with a protruding post. The first arm has a notch and configured to avoid the protruding post by means of the notch during the closing of the door body.

In some embodiments, the support is further provided with a block blocking at least a part of the rotating arm.

In some embodiments, a top surface of the block has an inclined surface, the inclined surface being configured to guide the door hook to be abutted against the contact arm during the closing of the door body.

In some embodiments, the door hook includes a lower door hook. The support is provided with a first switch. The switch includes a second switch and a third switch. The buffer assembly is configured such that, during the closing of the door body, the driving lever is driven by the lower door hook to trigger the first switch, and the rotating lever is driven by the lower door hook to trigger the second switch and the third switch sequentially.

In some embodiments, the door hook has an end having a first guide surface. The driving lever includes a first arm and a second arm spaced apart from each other, the second arm having a second guide surface at a side of the second arm. During the closing of the door body, the first guide surface is cooperatively connected to the second guide surface to allow the door hook to be caught by the second arm after an end of the door hook moves through the second arm.

Additional embodiments of the present disclosure will become apparent at least in part from the following description, or can be learned from practicing of the present disclosure.

BRIEF DESCRIPTION OF THE DRAWINGS

The above and/or additional embodiments of the present disclosure will become more apparent and more understandable from the following description of embodiments taken in conjunction with the accompanying drawings, in which:

FIG. 18 is a sectional view along a line A-A of FIG. 17.

FIG. 23 is a sectional view along a line B-B of FIG. 22.

FIG. 29 is a sectional view along a line C-C of FIG. 28.

FIG. 35 is a sectional view along a line D-D of FIG. 34.

FIG. 79 is a sectional view along a line A-A of FIG. 78.

FIG. 84 is a sectional view along a line C-C of FIG. 83.

FIG. 90 is a sectional view along a line D-D of FIG. 89.

DETAILED DESCRIPTION OF THE DISCLOSURE

Figure 1:
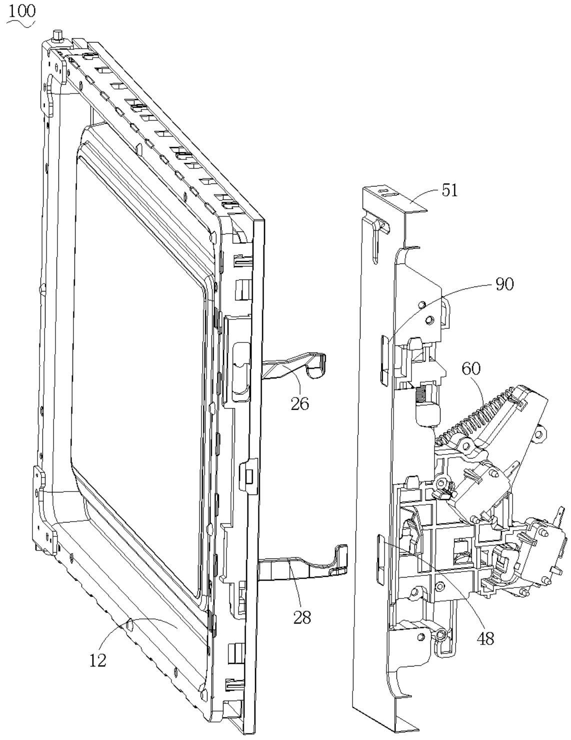
FIG. 1 to FIG. 4 are schematic views showing a structure of a household appliance according to the embodiments of the present disclosure.
Figure 2:
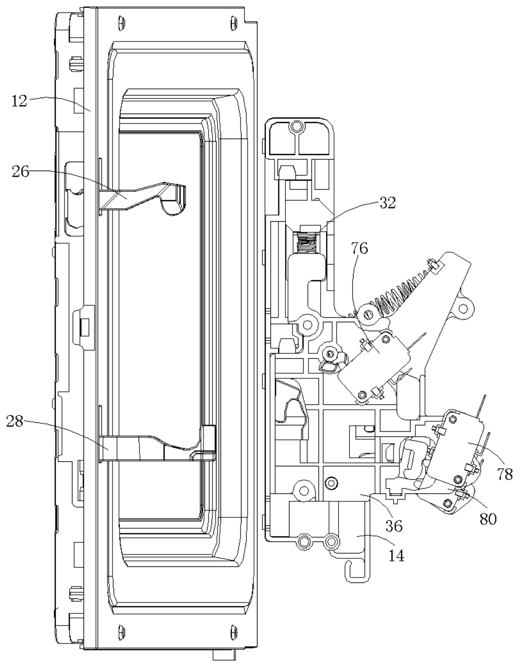

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the description of the present disclosure, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc., is based on the orientation or position relationship shown in the drawings, and is only for the convenience of describing the present disclosure and simplifying the description, rather than indicating or implying that the pointed apparatus or element must have a specific orientation, or be constructed and operated in a specific orientation, and therefore cannot be understood as a limitation to the present disclosure. In the description of the present disclosure, "plurality" means at least two, unless otherwise specifically defined.

A number of embodiments or examples are provided in the disclosure of the present disclosure to implement different structures of the present disclosure. To simplify the disclosure of the present disclosure, components and arrangements of particular examples will be described below, which are, of course, examples only and are not intended to limit the present disclosure. Furthermore, reference numerals and/or reference letters may be repeated in different examples of the present disclosure. Such repetition is for the purpose of simplicity and clarity and does not indicate any relationship between various embodiments and/or arrangements in question. In addition, various examples of specific processes and materials are provided in the present disclosure.

Referring to FIG. 1 to FIG. 11 and FIG. 50 to FIG. 51, a household appliance 100 according to an embodiment of the present disclosure includes a door body 12, a support 14 and a buffer assembly 16. The door body 12 is provided with a door hook and is connected to the support 14 through rotating. The buffer assembly 16 is mounted at support 14 and includes a first elastic driving member 60, a second elastic driving member 64, a damper 18, and a driving lever 20. The damper 18 is movably connected to the driving lever 20, and the driving lever 20 is provided with a connection portion 70. The first elastic driving member 60 and the second elastic driving member 64 are connected to the connection portion 70.

When the door body 12 is opened, the door hook is disengaged from the driving lever 20, an angle T1 between the first elastic driving member 60 and a first connecting line L1 is selected from the range 0 degrees to 60 degrees, and an angle T2 between the second elastic driving member 64 and a second connecting line L2 is selected from the range 0 degrees to 60 degrees. The first connecting line L1 is between a rotation center of the driving lever 20 and a first connection between the first elastic driving member 60 and the connection portion 70. The second connecting line L2 is between the rotation center of the driving lever 20 and a second connection between the second driving elastic portion 64 and the connection portion 70.

When the door body 12 is closed, the door hook is abutted against the driving lever 20 and the driving lever 20 presses the damper 18.

In the household appliance 100, when the door body 12 is opened, an angle range between the first elastic driving member 60 and the second elastic driving member 64 and a target connecting line is set. Thus, two elastic driving members can provide an appropriate driving force during the closing of the door body 12, and the door body 12 can be closed smoothly.

In an exemplary embodiment of the present disclosure, the household appliance 100 includes, but is not limited to, a microwave oven, an oven (including an electric oven, a microwave oven, and a micro-steaming and baking machine), a steam box, a dishwasher, a sterilization cabinet, and the like having the door body 12. In the embodiments of the present disclosure, the household appliance 100 is taken as an example of the microwave oven, which is for convenience of understanding the implementation of the present disclosure and should not be construed as a limitation of the present disclosure.

The door body 12 may be a dual-glazed door body 12, and the door body 12 may further be a wave-proof glass door body 12. One of benefits of using a glass door body 12 is that the glass is convenient for users to observe food inside the household appliance 100 from the outside. In addition, an outer surface of the door body 12 may be provided with a handle, which is convenient for the users to open or close the door.

Figure 12:
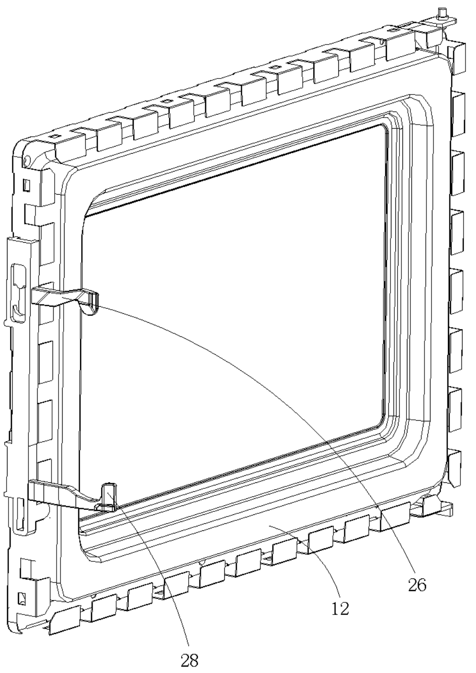
FIG. 12 to FIG. 13 are assembly views showing a door hook and a door body according to the embodiments of the present disclosure.
Figure 13:
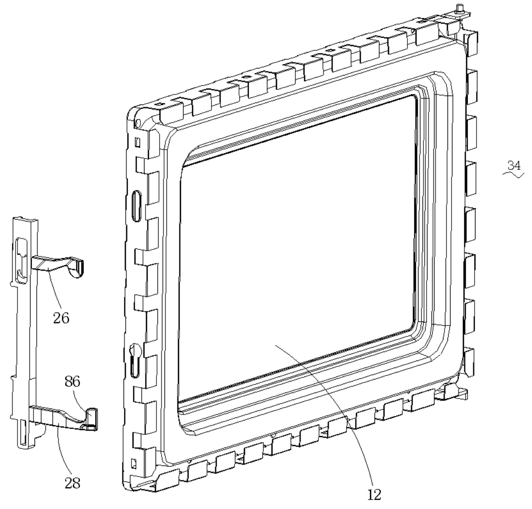

The door hook may be made of metal materials or plastic materials, or different materials that are combined. The door hook as a whole is strip-shaped. A hook-shaped portion 86 is arranged at an end of the door hook, and may be conveniently snapped. A number of door hooks may be determined based on an actual situation. For example, the number of door hooks may be single, two, or more than two. In an embodiment of the present disclosure, the door hook includes two door hooks, namely an upper door hook 26 and a lower door hook 28 as shown in FIG. 12 and FIG. 13. In an embodiment, the upper door hook 26 and the lower door hook 28 may be joined to form an integral structural member fixed to the door body 12. In other embodiments, the upper door hook 26 and the lower door hook 28 may be separately fixed to the door body 12, or the door hook may be connected to the door body 12 through moving, which is not specifically limited.

During the closing of the door body 12, the lower door hook 28 receives a buffer force of the buffer assembly 16 to reduce door closing noise. That is, when the door body 12 closed, the lower door hook 28 abuts against the driving lever 20 and the driving lever 20 presses the damper 18. When the door body 12 is opened, the lower door hook 28 is disengaged from the driving lever 20, and the damper 18 has the longest length. It should be understood that, in other embodiments, the upper door hook 26 may receive the buffer force of the buffer assembly 16 to reduce the door closing noise, or both the upper door hook 26 and the lower door hook 28 may receive the buffer force of the buffer assembly 16 to reduce the door closing noise, which is not specifically limited herein. In the following embodiments, the lower door hook 28 received the buffer force of the buffer assembly 16 is taken as an example.

Referring to FIG. 10, FIG. 11, FIG. 40, and FIG. 41, the household appliance 100 further includes an inclined block 30 and a compression spring 32, which are mounted at the support 14. The inclined block 30 has a receiving space, and the compression spring 32 is partially received in the receiving space. A top of the compression spring 32 abuts against a top wall of the receiving space, and a bottom of the compression spring 32 abuts against a support member extending into the receiving space at the support 14. The top of the inclined block 30 has an inclined surface 74 that slopes upward toward an interior of the support 14 in a vertical direction.

During the closing of the door body 12, an end of the upper door hook 26 abuts against the inclined surface 74 to lower the inclined block 30 to press the compression spring 32. When the end of the upper door hook 26 crosses the inclined surface 74, the inclined block 30 is caught by the upper door hook 26 under an action of the compression spring 32.

During the opening the door body 12, the upper door hook 26 presses the inclined block 30 and moves downwards, and the upper door hook 26 moves outwards until it is completely disengaged from the inclined block 30. The compression spring 32 resets the inclined block 30.

Figure 63:
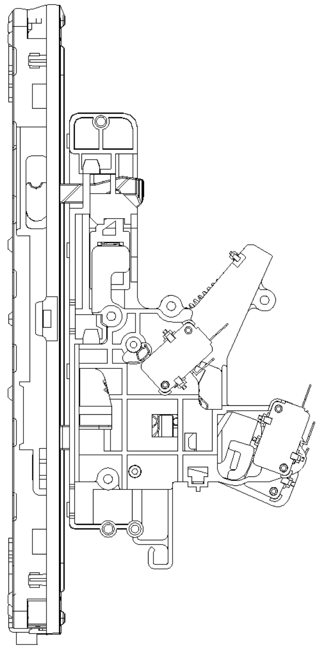
FIG. 63 to FIG. 65 are schematic views showing a door closed state of a household appliance according to the embodiments of the present disclosure.
Figure 64:
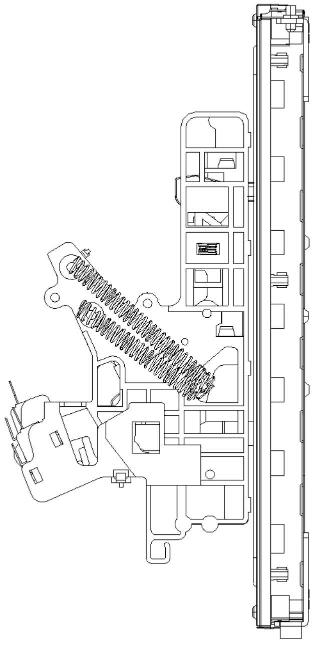
Figure 65:
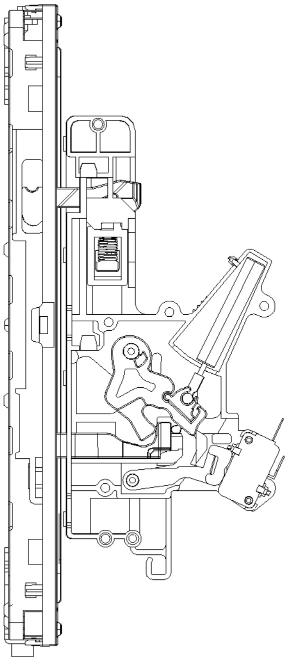
Figure 66:
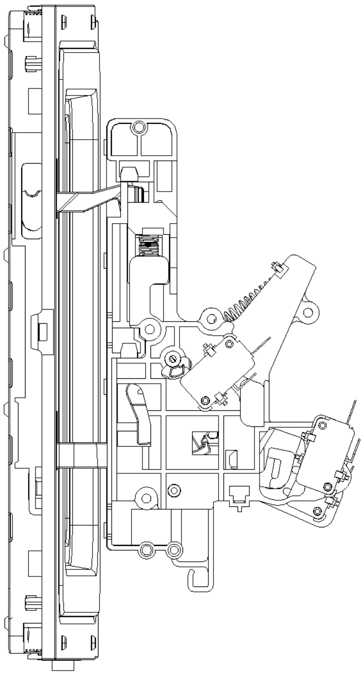
FIG. 66 to FIG. 68 are schematic views showing a door opening process of a household appliance according to the embodiments of the present disclosure.
Figure 67:
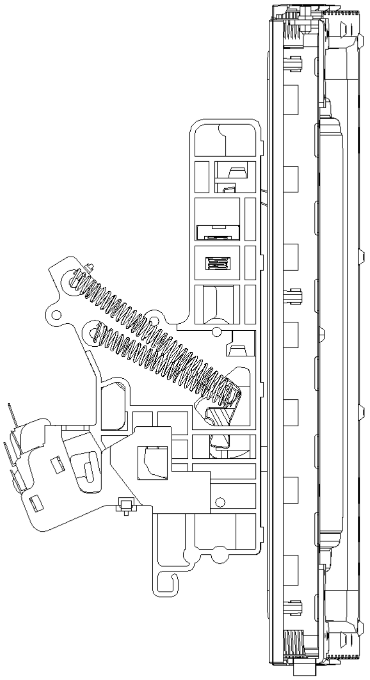

In the embodiments of the present disclosure, the door body 12 being opened may refer to a state in which the lower door hook 28 does not apply a force to rotate the driving lever 20 when the door body 12 is opened, or an applied force is insufficient to rotate the driving lever 20, as shown in FIG. 1 to FIG. 4. The door body 12 being closed may refer to a state in which the lower door hook 28 is in a final position of a door closing process, as shown in FIG. 63 to FIG. 65.

The household appliance 100 may include a cavity (not shown in the drawings). The support 14 may be fixed to the cavity, and the door body 12 is connected to the cavity through rotating. The cavity is provided with a chamber, and a front side of the cavity has an opening. the door body 12 is configured to close and open the opening. Food to be heated may be placed in the chamber.

The damper 18 includes a body 22 rotatably mounted at the support 14 and a rod 24 movably connected to the body 22. The body 22 and the rod 24 are rotatable to match the rotation of driving lever 20 during the opening and closing of door body 12. It will be appreciated that in other embodiments, the body 22 may be fixed against rotation.

In an embodiment, the buffer assembly 16 further includes a rocking block 34 rotatably connected to the driving lever 20 and the damper 18. When the lower door hook 28 applies force to the driving lever 20, the driving lever 20 rotates by a predetermined angle to drive the rocking block 34 to press the damper 18. When the damper 18 is pressed, the rocking block 34 provides damping to the lower door hook 28 and rotates. In this way, when the lower door hook 28 applies force to the driving lever 20, the driving lever 20 can rotate by a predetermined angle first and then drive the rocking block 34 to press the damper 18. In turn, it can be realized that when the lower door hook 28 acts on an initial stage of the driving lever 20, the lower door hook 28 is not rebounded by the damper 18 and causes the closing of the door to be not smooth or even stagnant phenomenon, which improves the user experience.

In an exemplary embodiment of the present disclosure, referring to FIG. 34 to FIG. 39, the driving lever 20 has a receiving groove 35, and a rotating space 37 is arranged at a top of the receiving groove 35. A swinging space 39 is arranged at a bottom of the receiving groove 35. One end of the rocking block 34 is rotatably received in the rotating space 37, and another end of the rocking block 34 is received in the swinging space 39. The swinging space 39 is configured to provide a space for the driving lever 20 to rotate by a predetermined angle. In this way, the driving lever 20 can drive the rocking block 34 to rotate after rotating a predetermined angle.

The driving lever 20 includes a first arm 52 and a second arm 54 spaced apart from each other, and a spacing is formed between the first arm 52 and the second arm 54. The second arm 54 is closer to the door body 12 (door hook) than the first arm 52, and the second arm 54 is shorter than the first arm 52 relative to a rotational axis of the driving lever 20.

Figure 34:
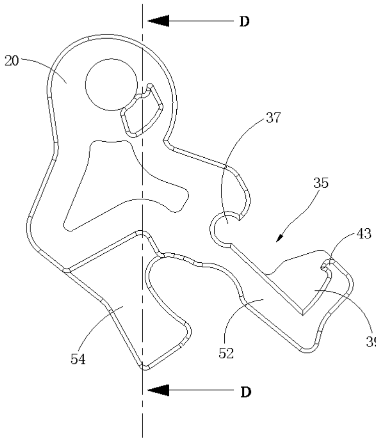
FIG. 34 to FIG. 39 are schematic views showing a structure of a driving lever according to the embodiments of the present disclosure.
Figure 35:
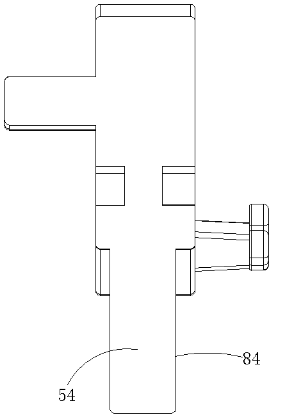
Figure 36:
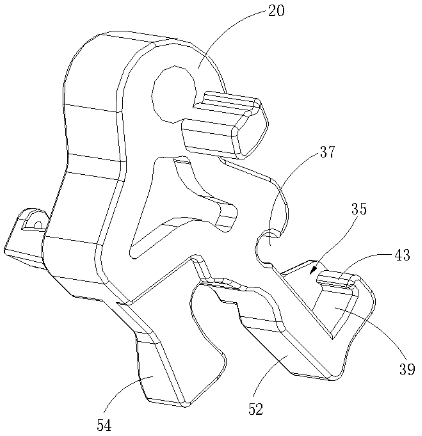
Figure 37:
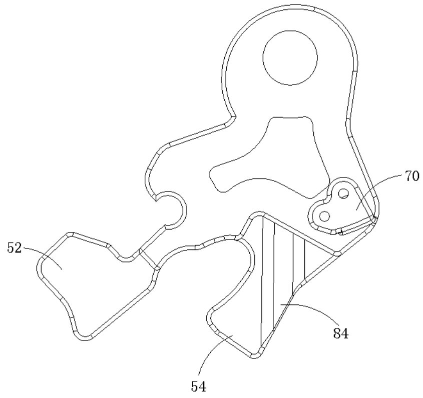
Figure 38:
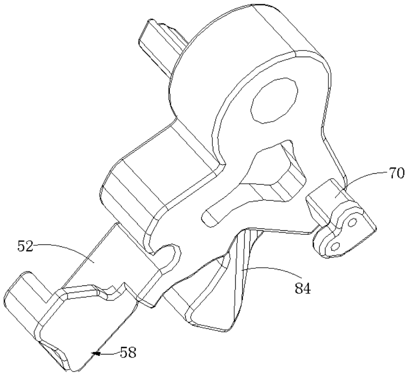
Figure 39:
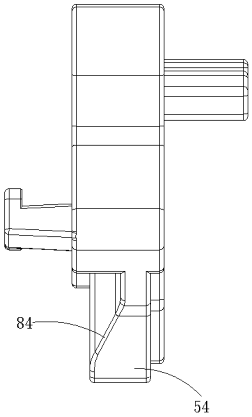

The first arm 52 has receiving groove 35. In an exemplary embodiment of the present disclosure, as shown in FIG. 34, the receiving groove 35 is arranged at a right side of the first arm 52, and the rocking block 34 is located in the receiving groove 35.

Figure 14:
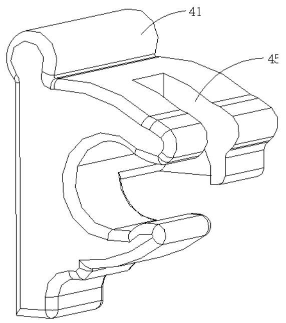
FIG. 14 to FIG. 16 are schematic views showing a structure of a rocking block according to the embodiments of the present disclosure.
Figure 15:
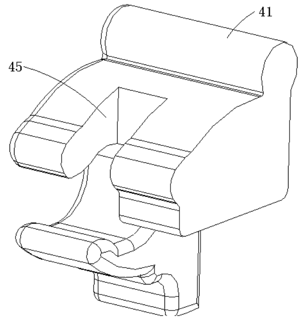
Figure 16:
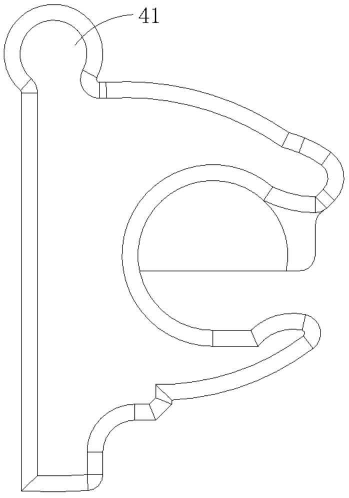
Figure 17:
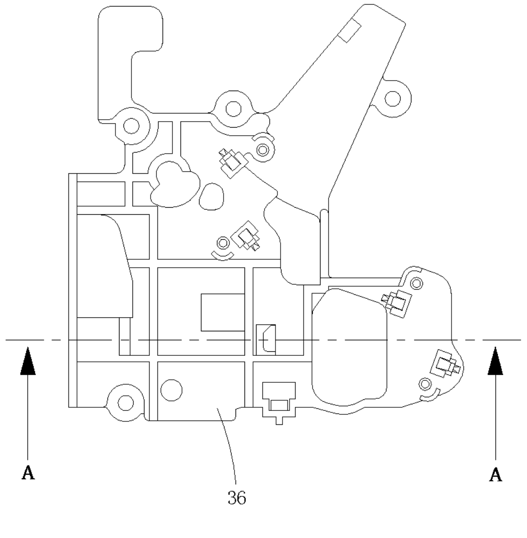
FIG. 17 to FIG. 21 are schematic views showing a structure of a protective cover according to the embodiments of the present disclosure.
Figure 18:
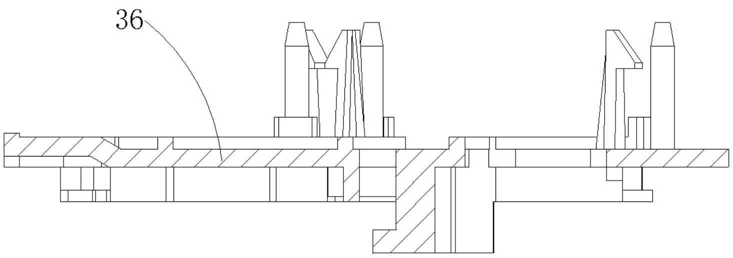
Figure 19:
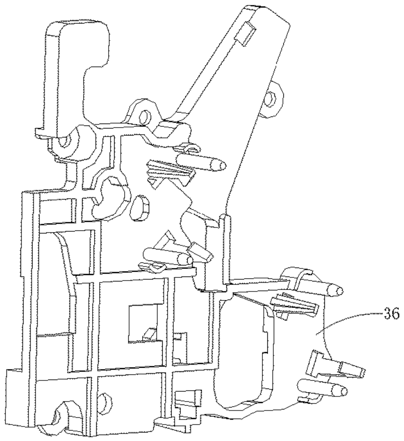

Referring to FIG. 14 to FIG. 16, a top end of the rocking block 34 is provided with a connecting rotation portion 41, and the connecting rotation portion 41 is rotatably received in the rotating space 37. In an exemplary embodiment of the present disclosure, the rotation space 37 is of a substantially cylindrical shape, and the connecting rotation portion 41 is of a cylindrical shape matching the rotation space 37.

The swing space 39 is configured such that when the driving lever 20 starts to rotate, the driving lever 20 will not act on the rocking block 34, and further will not press the damper 18. In this way, the lower door hook 28 will not receive resistance from the damper 18 at the initial stage of abutting against the driving lever 20, causing rebound or even stagnation. A size of the swing space 39 can determine a size of the predetermined angle, and can be calibrated based on actual conditions.

Further, a protrusion 43 is arranged at a right side of the swing space 39, and the protrusion 43 is configured to limit the rocking block 34 in the receiving groove 35 and prevent the rocking block 34 from disengaging from the receiving groove 35.

Referring to FIG. 14, the rocking block 34 further has a slot 45 at the top end of the rocking block 34. The rod 24 of the damper 18 penetrates the slot 45 to be rotatably connected to the rocking block 34. The slot 45 is arranged to avoid the rod 24 during a rotation of the damper 18.

Figure 4:
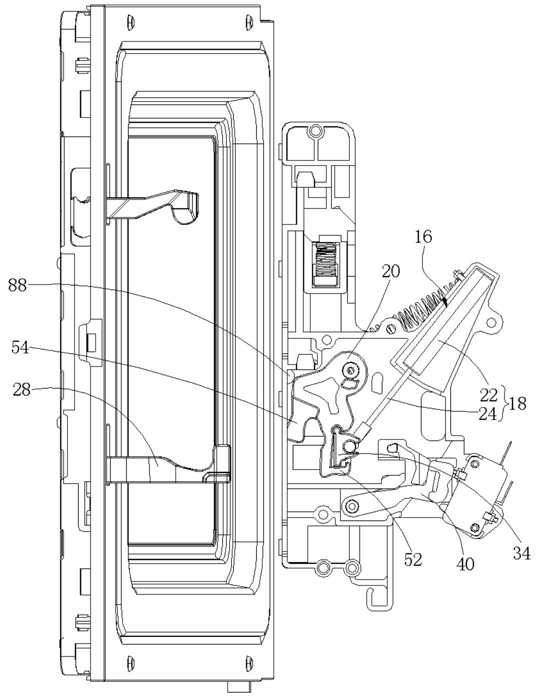
Figure 68:
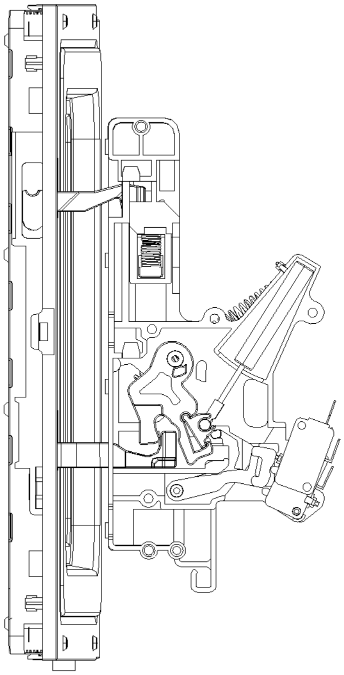

Referring to FIG. 4, during the closing of the door body 12, the lower door hook 28 pushes the driving lever 20 to rotate counterclockwise. After the driving lever 20 rotates by a predetermined angle (eliminating a gap between the driving lever 20 and the rocking block 34), the rocking block 34 applies force to the rod 24 to push the rod 24 to move into the body 22. The body 22 provides damping force to the rod 24 to reduce a closing speed of the door body 12, thereby reducing the door closing noise. Referring to FIG. 68, during the opening of the door body 12, the lower door hook 28 drives the driving lever 20 to rotate clockwise, the driving lever 20 may drive the rod 24 to move through the rocking block 34. In this case, the rod 24 is driven by the body 22 to extend out of the body 22 until the driving lever 20 stops rotating, and the damper 18 returns to the initial state.

Figure 30:
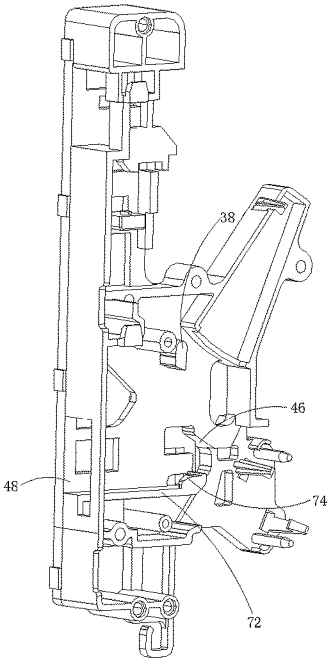
Figure 31:
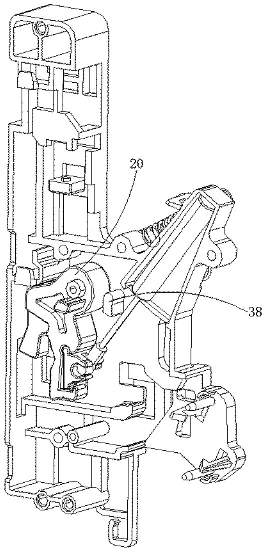

In some embodiments, referring to FIG. 30, the support 14 is provided with a limit post 38. The limit post 38 abuts against the driving lever 20 and limits a rotation of the driving lever 20 when the door body 12 is closed. In this way, a rotation range of the driving lever 20 can be limited, and damage to the driving lever 20 can be prevented.

In an exemplary embodiment of the present disclosure, a position of the limit post 38 may be set, enabling that the rotation of the driving lever 20 does not exceed the position in which the limit post 38 is located. This position is a position to which the driving lever 20 is rotated after the door is closed.

Figure 32:
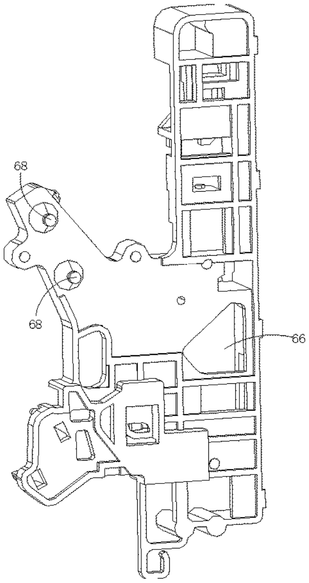
Figure 33:
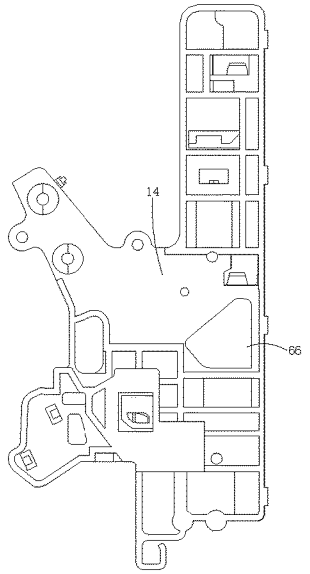

The household appliance 100 according to the embodiment of the present disclosure includes two elastic driving members, that is, the first elastic driving member 60 and the second elastic driving member 64. The two elastic driving members and the driving lever 20 are respectively located at opposite sides of the support 14, and the driving lever 20 and the damper 18 are located at a same side of the support 14. The support 14 has a through hole 66. As shown in FIG. 32 and FIG. 33, the connection portion 70 penetrates the through hole 66, which allows that the connection portion 70 can be connected to the two elastic driving members. The two elastic driving members may be configured to drive the driving lever 20 to rotate faster to allow the driving lever 20 to accelerate the door body 12. In this way, it can be achieved that the lower door hook 28 (the door body 12) can be accelerated and then decelerated.

When the door body 12 is opened, an angle T1 between the first elastic driving member 60 and the first connecting line L1 ranges from 0 degree to 60 degrees. In an exemplary embodiment of the present disclosure, the angle T1 may be 0 degree, 20 degrees, 30 degrees, 40 degrees, 50 degrees, or 60 degrees, or other degrees between 0 degree and 60 degrees.

An angle T2 between the second elastic driving member 64 and the second connecting line L2 ranges from 0 degree to 60 degrees. In an exemplary embodiment of the present disclosure, the angle T2 may be 0 degree, 20 degrees, 30 degrees, 40 degrees, 50 degrees, or 60 degrees, or other degrees between 0 degrees and 60 degrees. The angle T1 and the angle T2 may be same or different. Since a position and an angle of the elastic driving member before closing the door determines positions and angles of the two elastic driving members after closing the door. The angles and positions of the two elastic driving members can be changed adaptively following the rotation of the driving lever 20. Final positions and angles of the two elastic driving members after closing the door can be determined as long as a rotation angle of the driving lever 20 is determined. Therefore, the positions and angles of the two elastic driving members before closing the door can be determined by setting the size of the angle between the two elastic driving members and the target connecting line when the door body 12 is opened.

In illustrated embodiments, the elastic driving member is a spring. In other embodiments, the elastic driving member may further be an elastic member with other structures, and is not limited to a spring.

The elastic driving member and the driving lever 20 located at opposite sides of the support 14 can disperse relevant structural members, which allows to avoid space reduction and excessive weight concentration caused by too many structural members at the same side of the support 14, which is unfavorable to an allocation of the structural members.

Since the driving lever 20 can drive the lower door hook 28 to accelerate, the door body 12 can be closed by the force of the driving lever 20 during an acceleration stage. In an acceleration process of the lower door hook 28, when the driving lever 20 rotates, the damper 18 is pressed. As the door closing continues, the driving lever 20 continues to press the rod 24 of the damper 18. An amount of compression of the damper 18 increases, and the damping force provided by the damper 18 also increases. When the damping force provided by the damper 18 is greater than driving force provided by the elastic driving member, the lower door hook 28 starts to decelerate. Thus, noise when the door body 12 is closed is not too loud during the deceleration phase.

Figure 3:
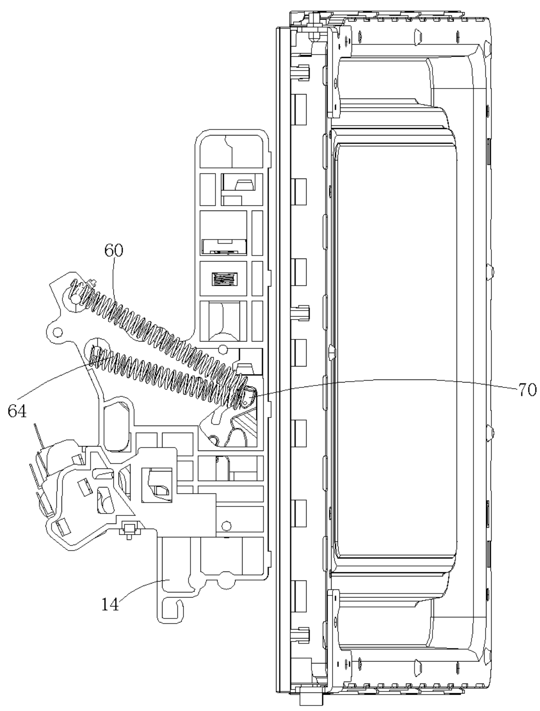

The first elastic driving member 60 is located above the second elastic driving member 64. Referring to FIG. 3 and FIG. 32, one end of the first elastic driving member 60 is hooked to a positioning post 68 on the support 14, and another end is hooked to the connection portion 70 on the driving lever 20. One end of the second elastic driving member 64 is hooked to another positioning post 68 on the support 14, and another end is hooked to the connection portion 70.

Figure 50:
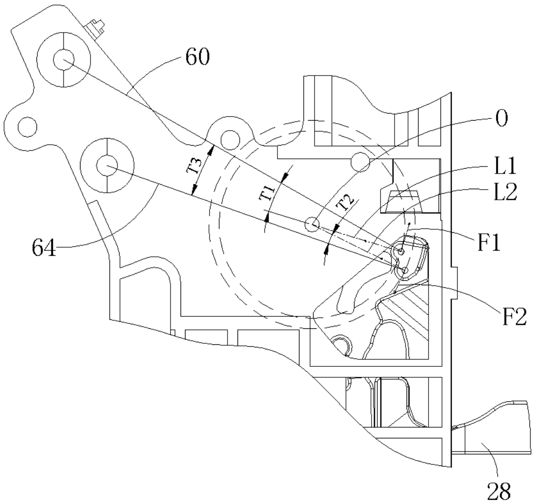
FIG. 50 to FIG. 51 are schematic views showing a stressed state of an elastic driving member in a first door closing process of a household appliance according to the embodiments of the present disclosure.

In some embodiments, referring to FIG. 50, an angle T3 between the first elastic driving member 60 and the second elastic driving member 64 ranges from 7 degrees to 110 degrees when the door body 12 is opened. In this way, angle settings of the two elastic driving members can be easily determined.

In an exemplary embodiment of the present disclosure, by setting an angle between one of the two elastic driving member and the target connecting line, and the angle T3 between the two elastic driving members, an angle between the other of the two elastic driving members and the target connecting line can be determined.

The angle T3 between the first elastic driving member 60 and the second elastic driving member 64 ranges from 7 degrees to 110 degrees. In an exemplary embodiment of the present disclosure, the angle T3 may be 7 degrees, 10 degrees, 30 degrees, 50 degrees, 70 degrees, 90 degrees, or 110 degrees, or other degrees between 7 degrees and 110 degrees.

Figure 51:
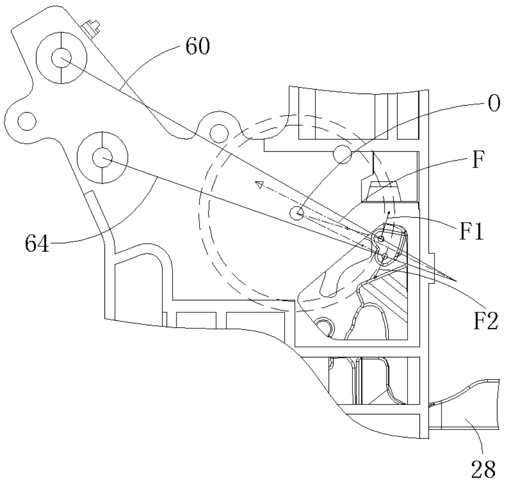
Figure 52:
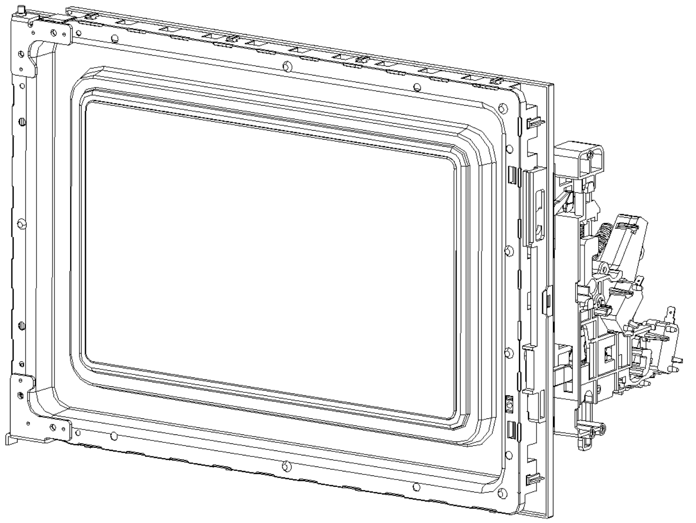
FIG. 52 to FIG. 55 are schematic views showing a second door closing process of a household appliance according to the embodiments of the present disclosure.
Figure 53:
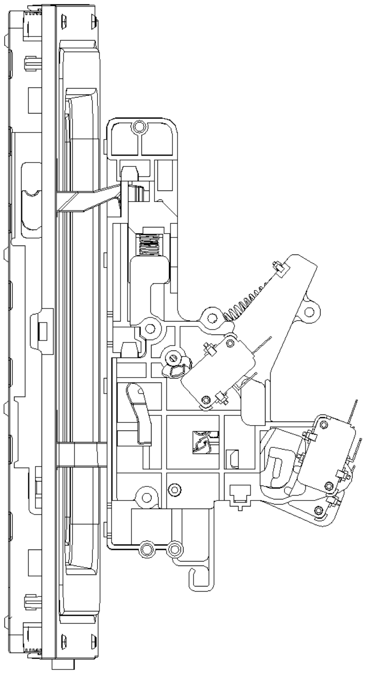
Figure 54:
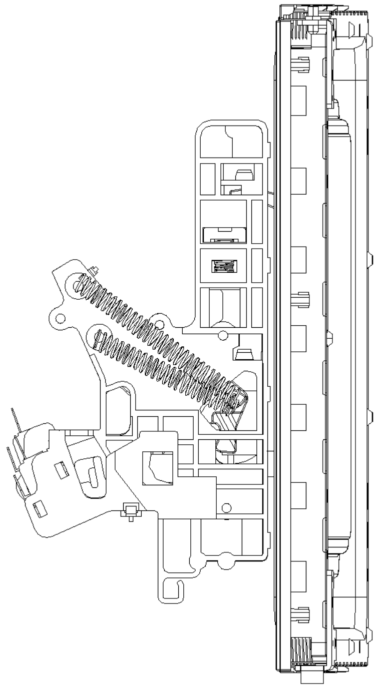
Figure 55:
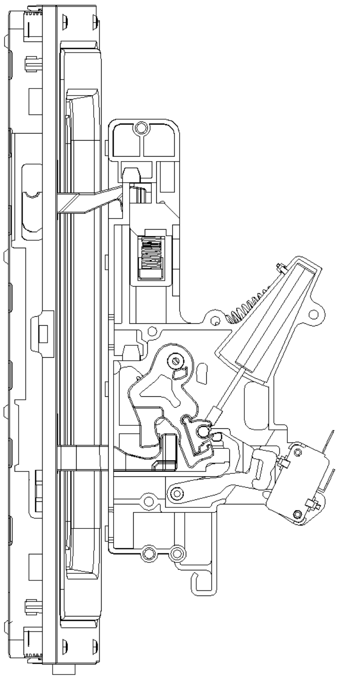
Figure 56:
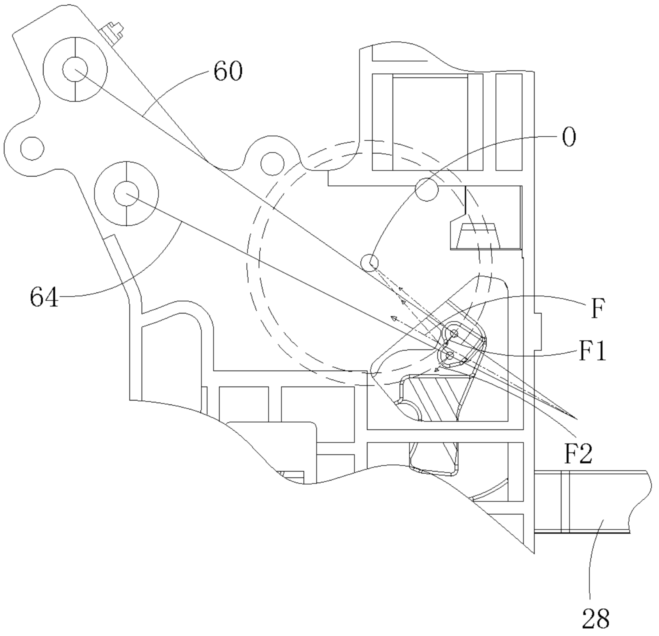
FIG. 56 is a schematic view showing a stressed state of an elastic driving member in a second door closing process of a household appliance according to the embodiments of the present disclosure.
Figure 57:
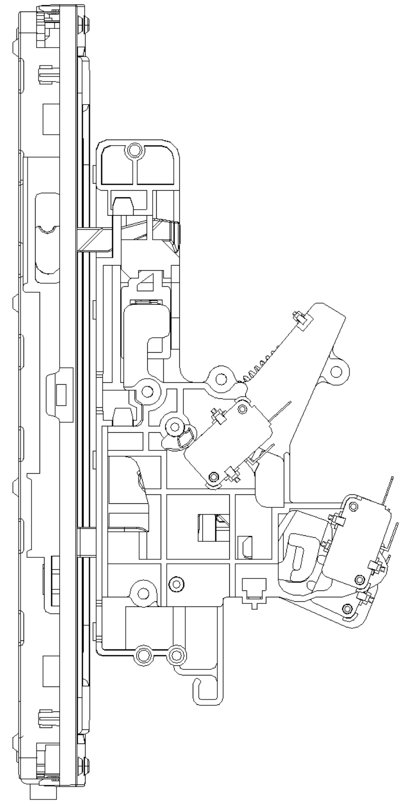
FIG. 57 to FIG. 59 are schematic views showing a third door closing process of a household appliance according to the embodiments of the present disclosure.
Figure 58:
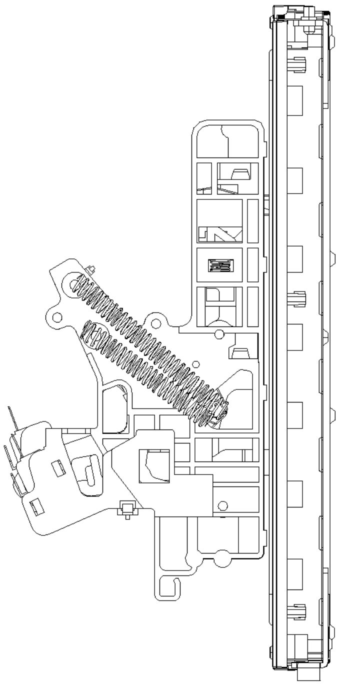
Figure 59:
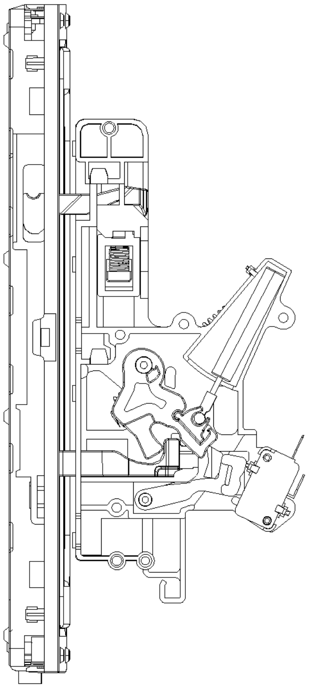

In some embodiments, referring to FIG. 51, a combined force F of the first elastic driving member 60 and the second elastic driving member 64 on the driving lever acts above the rotation center O of the driving lever 20 when the door body 12 is opened.

Figure 60:
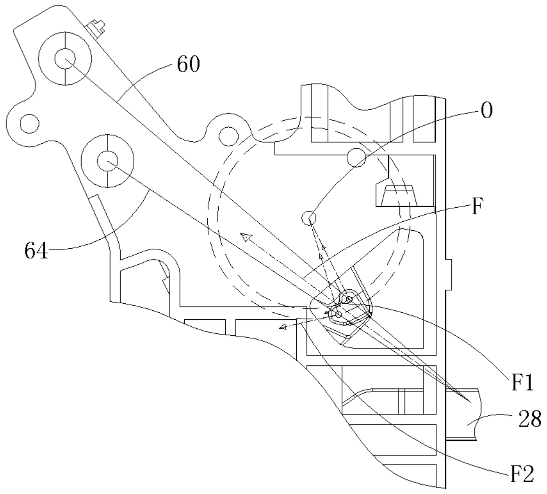
FIG. 60 is a schematic view showing a stressed state of an elastic driving member in a third door closing process of a household appliance according to the embodiments of the present disclosure.

Referring to FIG. 60, the combined force F of the first elastic driving member 60 and the second elastic driving member 64 on the driving lever acts below the rotation center O of the driving lever 20 when the door body 12 is closed. In this way, the driving lever 20 can rotate in different directions before and when the door is closed, which is beneficial to tightly closing the door.

In an example embodiment of the present disclosure, referring to FIG. 51, the combined force F of the two elastic driving members on the driving lever 20 on the driving lever 20 acts above the rotation center O of the driving lever 20, and the driving lever 20 can rotate in a first direction under the combined force of the two elastic driving members. Referring to FIG. 60, the combined force F of the two elastic driving members on the driving lever 20 acts below the rotation center O of the driving lever 20, and the driving lever 20 can rotate in a second direction under the combined force F of the two elastic driving members. The first direction is opposite to the second direction. In FIG. 51, the first direction is a counterclockwise direction, and in FIG. 60, the second direction is a clockwise direction.

When the lower door hook 28 does not abut against the driving lever 20, the driving lever 20 is stationary. The combined force F of the two elastic driving members acts on the driving lever 20, enabling that the driving lever 20 can rotate clockwise. When the lower door hook 28 abuts against the driving lever 20, the driving lever 20 rotates counterclockwise under an action of the lower door hook 28, which allows that the combined force F of the two elastic driving members on the driving lever 20 is switched to be below the rotation center O of the driving lever 20, and the driving lever 20 is converted from a clockwise rotation to a counterclockwise rotation. In this case, the driving lever 20 is not limited and continues to rotate counterclockwise to accelerate the lower door hook 28 under an action of the combined force F of the two elastic driving members.

The driving lever 20 has a process of changing the rotation direction, which enables that the rotation angle of the driving lever 20 is larger. The larger rotation angle of the driving lever 20 may drive the lower door hook 28 to penetrate deeper into the cavity, allowing that the door body 12 is more tightly closed.

In some embodiments, when the door body 12 is opened, the first elastic driving member 60 applies torque for rotating the driving level in a first direction to the driving lever 20 with a tangential component force F1 of the first elastic driving member 60, and the second elastic driving member 64 applies torque for rotating the driving level in a second direction to the driving lever 20 with a tangential component force F2 of the second elastic driving member 64. The second direction is opposite to the first direction. The torque applied by the first elastic driving member 60 is greater than the torque applied by the second elastic driving member 64. In this way, the driving lever 20 can rotate in the first direction.

Referring to FIG. 51, the first direction is counterclockwise and the second direction is clockwise. The combined force F of the two elastic driving members on the driving lever 20 acts above the rotation center O of the driving lever 20, allowing the rotating lever 20 to rotate counterclockwise. As can be seen from FIG. 51, the tangential component force F1 of the first elastic driving member 60 applies torque for rotating the driving level 20 counterclockwise. The tangential component force F2 of the second elastic driving member 64 applies torque for rotating the driving level 20 clockwise. The torque applied by the first elastic driving member 60 is greater than the torque applied by the second elastic driving member 64, which enables that the driving lever 20 can rotate counterclockwise.

In some embodiments, when the door body 12 is closed, the first elastic driving member 60 applies torque for rotating the driving level 20 in a second direction to the driving lever 20 with a tangential component force F1 of the first elastic driving member 60, and the second elastic driving member 64 applies torque for rotating the driving level 20 in the second direction to the driving lever 20 with a tangential component force F2 of the second elastic driving member 64. The torque applied by the second elastic driving member 64 is greater than the torque applied by the first elastic driving member 60. In this way, the door body 12 can be closed tightly.

In an exemplary embodiment of the present disclosure, referring to FIG. 60, the second direction is clockwise. Torque applied by the two elastic driving members can rotate the driving lever 20 clockwise, enabling that the driving lever 20 to close the door body 12 more tightly by the lower door hook 28.

In this embodiment, a door closing process may be divided into three processes: a first door closing process, a second door closing process, and a third door closing process.

Referring to FIG. 46 to FIG. 51, at a beginning of the first door closing process, a momentary state of the lower door hook 28 touching the driving lever 20 is shown. As can be seen from FIG. 51, in this case, the combined force F of the two elastic driving members on the driving lever 20 acts above the rotation center O of the driving lever 20, forcing the driving lever 20 to rotate counterclockwise. As can be seen from FIG. 51, the tangential component force F1 of the first elastic driving member 60 applies the torque for rotating the driving level 20 counterclockwise. The tangential component force F2 of the second elastic driving member 64 applies the torque for rotating the driving level 20 clockwise. The torque applied by the first elastic driving member 60 is greater than the torque applied by the second elastic driving member 64. The driving lever 20 can rotate counterclockwise but is limited. Therefore, the driving lever 20 is stationary.

The second door closing process includes operations as follows. The lower door hook 28 is driven by the driving lever 20 to move into the support 14 (which can be understood as "the lower door hook 28 is sucked into the driving lever 20").

Referring to FIG. 52 to FIG. 56, the combined force F of the two elastic driving members on the driving lever 20 acts below the rotation center O of the driving lever 20, and the two elastic driving members are located below the rotation center O of the driving lever 20. In this case, the two elastic driving members rotate the driving lever 20 clockwise. The two elastic driving members apply a relatively small tangential component force, which in turn applies a relatively small torque to the driving lever 20. In addition, in a process from the first door closing process to the second door closing process, a length of the first elastic driving member 60 becomes longer and then becomes shorter, and an elastic force first increases and then decreases. In the process from the first door closing process to the second door closing process, a length of the second elastic driving member 64 is always decreasing and the elastic force is also decreasing. For this process, the second elastic driving member 64 contributes the main torque.

The third door closing process includes that the lower door hook 28 begins to push the rotating lever 20 to rotate.

Referring to FIG. 57 to FIG. 60, the torque applied to the driving lever 20 by the combined force F of the two elastic driving members increases continuously from the second door closing process to the third door closing process. That is, the torque applied by the tangential component force of the two elastic driving members is continuously increasing until the door body 12 is in a closed position. The second elastic driving member 64 contributes more torque.

Figure 61:
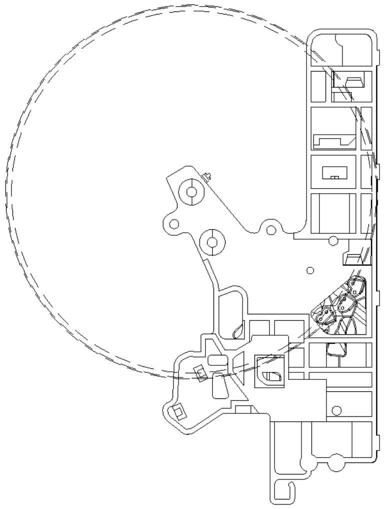
FIG. 61 is a view showing a length change of a first elastic driving member in a door closing process according to the embodiments of the present disclosure.
Figure 62:
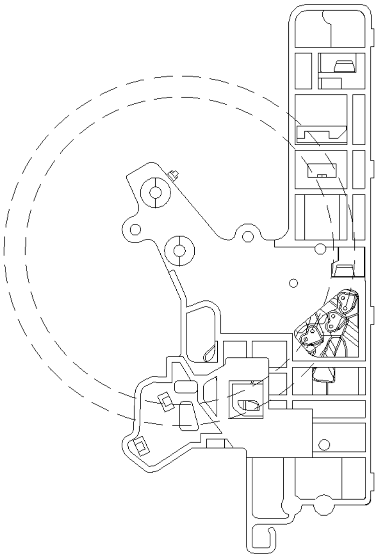
FIG. 62 is a view showing a length change of a second elastic driving member in a door closing process according to the embodiments of the present disclosure.

Referring to FIG. 61 and FIG. 62, it can be seen from the figures that a length change of the two elastic driving members is small. The length can also be approximated as being constant throughout a movement, only the direction of the force is changing. FIG. 61 shows a length change of the first elastic driving member 60. A radius of a middle circle is a length of the first elastic driving member 60 when the door body 12 is opened. A radius of an outermost circle is a length of the first elastic driving member 60 during the closing of the door body, and a radius of an innermost circle is a length of the first elastic driving member 60 when the door body 12 is closed. FIG. 62 shows a length change of the second elastic driving member 64. A radius of an outer circle is a length of the second elastic driving member 64 when the door body 12 is opened, and a radius of an inner circle is a length of the second elastic driving member 64 when the door body 12 is closed.

In some embodiments, referring to FIG. 4, the buffer assembly 16 further includes a rotating lever 40 rotatably connected to the support 14, and the support 14 is provided with a switch. When the door body 12 is closed, the door hook is abutted against the rotating lever 40 to trigger the switch by the rotating lever 40. In this way, an addition of the rotating lever 40, on the one hand, can meet safety requirements, on the other hand, can further reduce the door closing noise.

In an exemplary embodiment of the present disclosure, some household appliances 100 require the door body 12 to be closed before the household appliance 100 is allowed to operate. For example, after the door body 12 is closed, the microwave oven is allowed to emit microwaves into the cavity to heat food, which can prevent leakage from occurring when the door is not closed.

When the door body 12 is closed, the lower door hook 28 abuts against the rotating lever 40 to trigger the switch by the rotating lever 40. In this way, a control board of the household appliance 100 obtains a relevant trigger signal and controls the household appliance 100 to operate to meet the safety requirements.

During the closing of the door body 12, the lower door hook 28 approaches the rotating lever 40. When the lower door hook 28 abuts against the rotating lever 40, the rotating lever 40 may be driven to rotate clockwise. In this process, the lower door hook 28 and the door body 12 may be decelerated, thereby further reducing the door closing noise.

Figure 5:
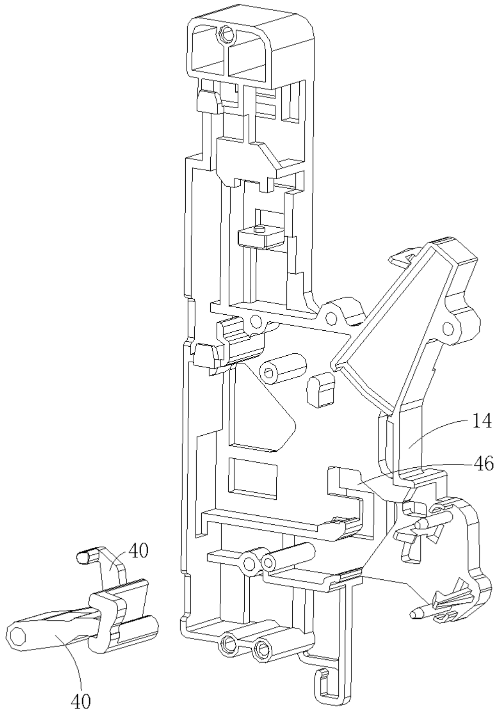
FIG. 5 to FIG. 6 are schematic views showing assembling a support and a rotating lever according to the embodiments of the present disclosure.
Figure 6:
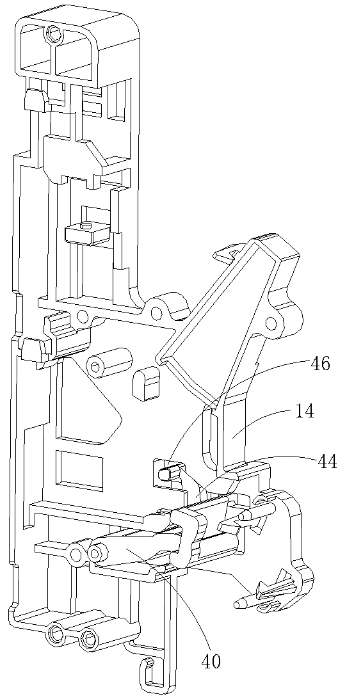
Figure 7:
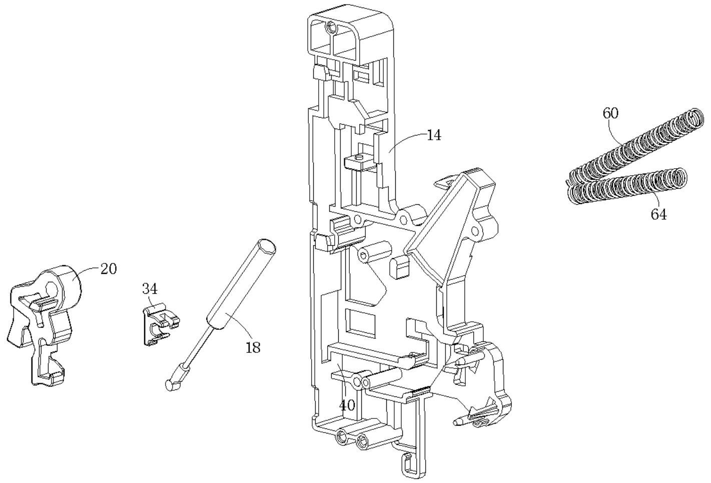
FIG. 7 is an exploded view showing a household appliance according to the embodiments of the present disclosure.
Figure 8:
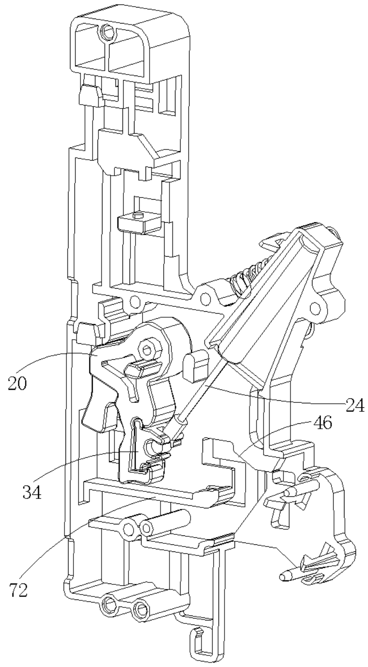
FIG. 8 to FIG. 10 are partial views showing a structure of a household appliance according to the embodiments of the present disclosure.
Figure 9:
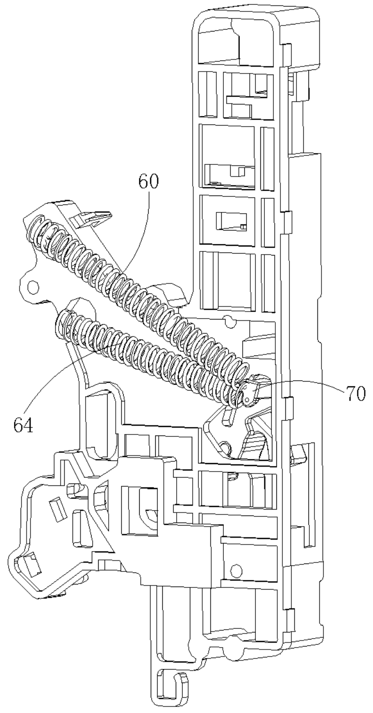
Figure 10:
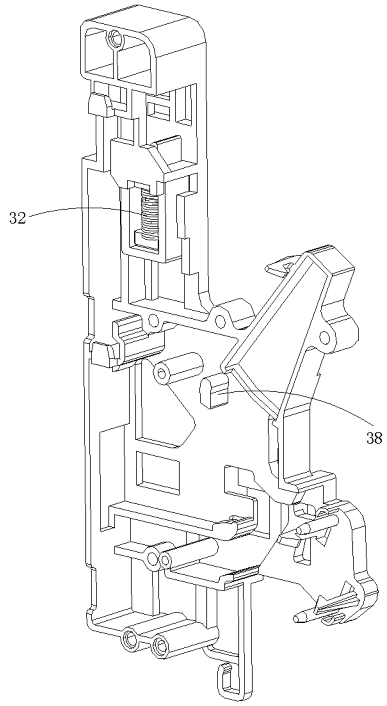
Figure 11:
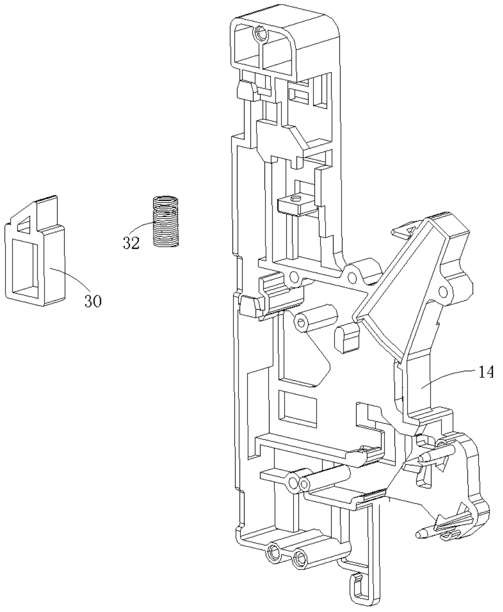
FIG. 11 is a partially exploded view showing a household appliance according to the embodiments of the present disclosure.

In some embodiments, as shown in FIG. 5, FIG. 6, and FIG. 42 to FIG. 45, the rotating lever 40 includes a rotating arm 42 rotatably connected to the support 14 and a contact arm 44 connected to the rotating arm 42. As shown in FIG. 5, FIG. 6 and FIG. 30, the support 14 has a groove 46, and the contact arm 44 is at least partially located in the groove 46, and the contact arm 44 is configured for a trigger switch. In this way, the rotating lever 40 can be protected from artificial triggers, which meets the safety requirements.

In an exemplary embodiment of the present disclosure, the contact arm 44 is away from a rotational axis of the rotating arm 42. During the closing of the door body 12, the lower door hook 28 may extend into the support 14 through a lower through hole 48 of a front plate 51 connected to the support 14 and push the contact arm 44 to rotate, to drive the whole rotating lever 40 to rotate. The contact arm 44 is at least partially located in the groove 46, which prevents an external thin rod or the like from extending into the support 14 through the lower through hole 48 to push the contact arm 44 to rotate and artificially trigger the switch. In this way, the household appliance 100 mistakenly believes that the door body 12 is closed, and then activates the appliance to cause the safety problem.

In addition, a projection 50 is further arranged at an inner side of the protective cover 36, and a shape of the projection 50 engages with a shape of the groove 46 to enclose the contact arm 44, further ensuring that the contact arm 44 is not triggered by mistake. In this case, a rotation of the contact arm 44 can be more stable.

In some embodiments, referring to FIG. 34 to FIG. 39, the driving lever 20 includes a first arm 52 and a second arm 54 spaced apart from each other. The door hook is configured to move, during the closing of the door body 12, through the second arm 54 below the second arm 54 to be abutted against the first arm 52, driving the driving lever 20 to rotate. The contact arm 44 is provided with a protruding post 56, and the first arm 52 has a notch 58. During the closing of the door body 12, the first arm 52 avoids the protruding post 56 by the notch 58. In this way, the contact arm 44 of the rotating lever 40 can pass smoothly without interference.

In an exemplary embodiment of the present disclosure, referring to FIG. 4, the first arm 52 and second arm 54 are located at a left side of the protruding post 56 when the door body 12 is opened. The first arm 52 is relatively long. During the closing of the door body 12, the lower door hook 28 moves below the second arm 54 and enters a space between the first arm 52 and the second arm 54. Then the lower door hook 28 abuts against the first arm 52 to drive the rotating lever 40 to rotate counterclockwise. In a process of rotating the driving lever 20, the second arm 54 is caught by the lower door hook 28, which enables that the driving lever 20 drives the lower door hook 28 to continue closing the door. The first arm 52 rotates toward the protruding post 56. By providing the notch 58, when the first arm 52 passes by, the first arm 52 does not interfere with the protruding post 56.

In this way, the lower door hook 28 can abut against the protruding post 56 and drive the rotating lever 40 to rotate clockwise. The door body 12 can be closed smoothly, and the switch can be triggered smoothly. After the door body 12 is closed, an end of the lower door hook 28 and the protruding post 56 are located in the space between the first arm 52 and the second arm 54, as shown in FIG. 65.

In some embodiments, as shown in FIG. 30, the support 14 further includes a block 72 blocking at least a part of the rotating arm 42. In this way, the rotating lever 40 can be protected from artificial triggers and meets the safety requirements.

In an exemplary embodiment of the present disclosure, the lower door hook 28 may extend into the support 14 through the lower through hole 48 in the support 14 during the closing of the door body 12, and push the contact arm 44 to rotate, to drive the whole rotating lever 40 to rotate. By arranging the block 72, the block 72 blocks at least a part of the rotating arm 42, which can prevent an external thin rod or the like from penetrating into the support 14 from the lower through hole 48 to push the rotating arm 42 to rotate and trigger the switch artificially. Therefore, the household appliance 100 mistakenly thinks that the door body 12 is closed, and then activates the appliance to cause the safety problem.

Figure 20:
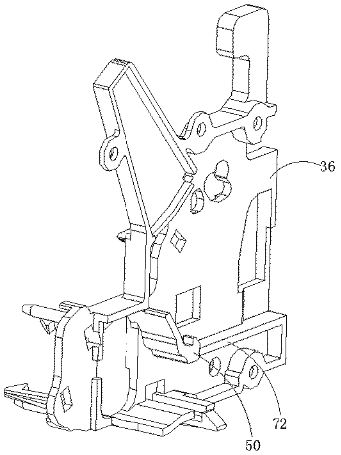
Figure 21:
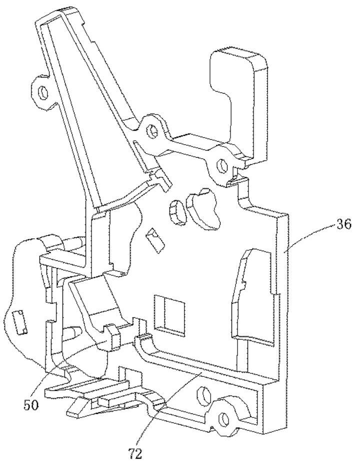
Figure 22:
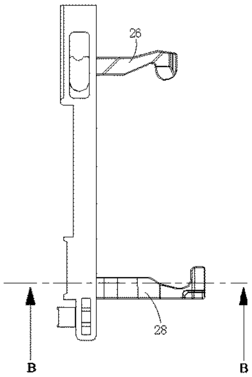
FIG. 22 to FIG. 27 are schematic views showing a structure of a door hook according to the embodiments of the present disclosure.
Figure 23:
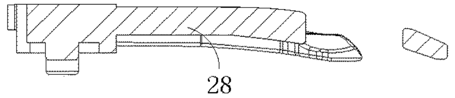
Figure 24:
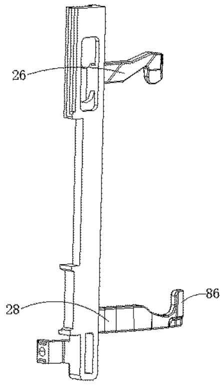
Figure 25:
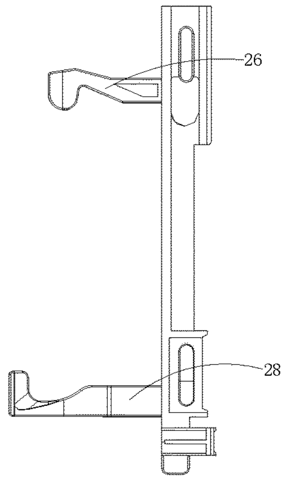
Figure 26:
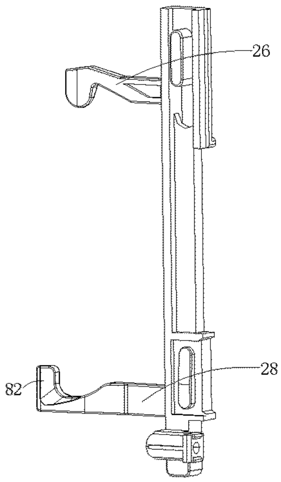
Figure 27:
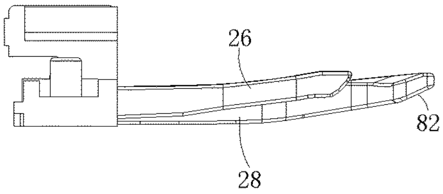
Figure 28:
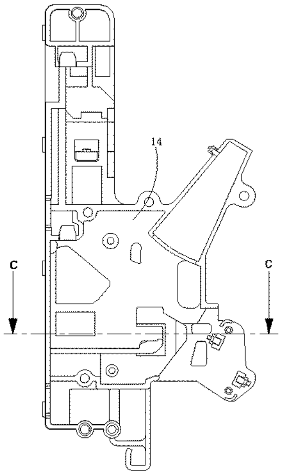
FIG. 28 to FIG. 33 are schematic views showing a structure of a support according to the embodiments of the present disclosure.
Figure 29:
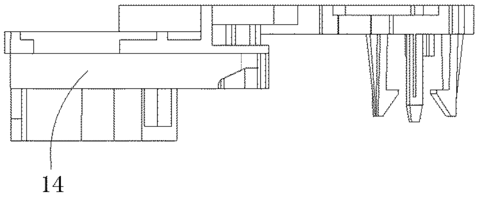

In addition, referring to FIG. 20, another block 72 is further arranged at the inner side of the protective cover 36. A shape of the block 72 on the support 14 matches a shape of the block 72 on the protective cover 36, allowing to completely block the rotating arm 42 and further ensure that the rotating arm 42 will not be triggered by mistake.

It should be understood that, in other embodiments, the block 72 on the support 14 may fully block the rotating arm 42.

In some embodiments, a top surface of the block 72 includes an inclined surface 74 configured to drive the door hook to abut against the contact arm 44 during the closing of door body 12. In this way, the door hook is ensured to enter a normal position during the closing of the door body 12 and contact with the rotating lever 40.

In an exemplary embodiment of the present disclosure, the lower door hook 28 moves toward the rotating lever 40 during the closing of door body 12. When the lower door hook 28 reaches the inclined surface 74, the inclined surface 74 guides an end of lower door hook 28 towards the contact arm 44, enabling the lower door hook 28 to contact with the protruding post 56 of the contact arm 44. The lower door hook 28 drives the rotating lever 40 to allow the rotating lever 40 to trigger the switch when the lower door hook 28 continues to move.

In some embodiments, the door hook includes the lower door hook 28. The support 14 is provided with a first switch 76, and the switch includes a second switch 78 and a third switch 80.

The buffer assembly 16 is configured such that, during the closing of the door body 12, the driving lever 20 is driven by the lower door hook 28 to trigger the first switch 76. The rotating lever 40 is driven by the lower door hook 28 to trigger the second switch 78 and the third switch 80 sequentially. In this way, after the driving lever 20 triggers the first switch 76, the rotating lever 40 sequentially triggers the second switch 78 and the third switch 80, which enables that the first switch 76, the second switch 78, and the third switch 80 are triggered in sequence, to avoid a problem of switch trigger sequence confusion.

In an exemplary embodiment of the present disclosure, the household appliance 100 may include a microwave oven including the first switch 76, the second switch 78, and the third switch 80. The first switch 76 may be a monitoring switch configured to monitor a whole microwave oven loop. The second switch 78 may be a secondary switch configured to control the turning on of lights and cooling fans or other components. The third switch 80 may be a primary switch configured to control a microwave function of the microwave oven. During the closing of the door body 12, the first switch 76, the second switch 78, and the third switch 80 are sequentially triggered to generate corresponding electrical signals, which enables that a control panel of the microwave oven can control an operation of the microwave oven.

During using the microwave oven, a trigger sequence of three switches is particularly important. During the closing of the door, the trigger sequence should be: first triggering the monitoring switch, second triggering the secondary switch, and last triggering the primary switch. In this way, use safety can be guaranteed and the safety requirements can be met.

It should be understood that, in other embodiments, a number of switches is not limited to three, and other numbers of switches are also possible. The number of switches and the trigger sequence are set based on the actual conditions, which are not specifically limited herein.

In some embodiment, the door hook has an end having a first guide surface 82.

Referring to FIG. 34 to FIG. 39, the driving lever 20 includes a first arm 52 and a second arm 54 spaced apart from each other, and the second arm 54 has a second guide surface 84 at a side surface of the second arm 54. During the closing of the door body 12, the first guide surface 82 is cooperatively connected to the second guide surface 84 to allow the door hook to be caught by the second arm 54 after an end of the door hook moves through the second arm 54. Thus, during the closing of the door body 12, the first guide surface 82 is cooperatively connected to the second guide surface 84, which enables that, after the end of the door hook moves through the second arm 54, the second arm 54 is caught by the door hook, to realize a forced door closing structure design. When the driving lever 20 is triggered abnormally, the appliance can be repaired without disassembly, and users can force the door to close and return the appliance to normal by themselves.

In an exemplary embodiment of the present disclosure, referring to FIG. 22 to FIG. 27, a hook-shaped portion 86 is arranged at the end of the lower door hook 28, and the hook-shaped portion 86 is configured to be easily engaged. The lower door hook 28 includes a first guide surface 82 arranged at the hook-shaped portion 86. In this way, the users may force the door to close, and the lower door hook 28 and the driving lever 20 can return to a normal mating position.

When the door is closed normally, the lower door hook 28 contacts with the first arm 52 of the driving lever 20 at a certain initial speed, and the lower door hook 28 can rotate the driving lever 20. The driving lever 20 triggers the first switch 76 after the driving lever 20 rotates, and then the second arm 54 of the driving lever 20 is caught by the lower door hook 28 to drive the lower door hook 28 to continue closing the door. The lower door hook 28 abuts against the contact arm 44 to rotate the rotating lever 40.

Figure 69:
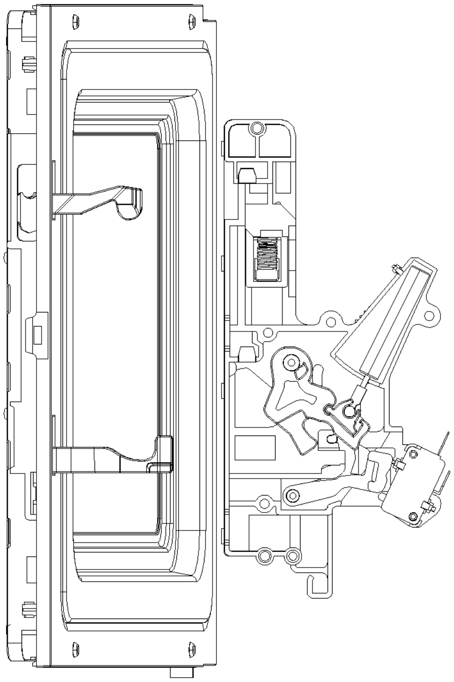
FIG. 69 is a schematic view showing a state of a driving lever after an abnormal trigger according to the embodiments of the present disclosure.

However, in real life, it is easy to force the driving lever 20 to be triggered (as shown in FIG. 69) because of abnormal means used by users or children, such as using a bamboo stick, finger or other slender object to insert into the support 14 to toggle the driving lever 20, which forces the driving lever 20 to be triggered. Therefore, the driving lever

20 rotates, and the lower door hook 28 cannot engages with the driving lever 20, which causes the door body 12 to fail to close and the household appliance 100 to lose function and even needs to be disassembled for maintenance. According to the household appliance 100 of the embodiments of the present disclosure, the end of the lower door hook 28 has the first guide surface 82, and the driving lever 20 includes the second guide surface 84. The first guide surface 82 is cooperatively connected to the second guide surface 84 to allow the door hook to be caught by the second arm 54 after the end of the door hook moves through the second arm 54. The user can restore a normal cooperation relationship between the lower door hook 28 and the driving lever 20 by using a relatively large force, which is no need to disassemble the appliance for maintenance.

In an embodiment, the end of low door hook 28 may be forced through a gap between the second arm 54 of the drive lever 20 and the support 14 by elastic deformation of the plastic. The first guide surface 82 and the second guide surface 84 may be guided inclined surfaces.

A principle process of opening and closing the door according to the embodiments of the present disclosure will be described below.

Descriptions of an initial state and a final state: At an initial time (when the door is not closed), the two elastic driving members connect to the support 14 and the driving lever 20, and the combined force F of the two elastic driving members is located above the rotation center O of the driving lever 20. In this case, the combined force F of the elastic driving member forces the driving lever 20 to have a clockwise rotation tendency, and the two elastic driving members are always in a stretched state. At the same time, the driving lever 20 is restrained from moving clockwise by the a stop post 88 on the support 14. The rocking block 34 is connected to the damper 18 and the driving lever 20, respectively, and can freely rotate around the driving lever 20. The compression spring 32 is always in a compressed state. At a final time (the time after the door is opened), the lower door hook 28 pulls the driving lever 20 to move outward. In this case, an angle between the rocking block 34 and the driving lever 20 is the largest. The lower door hook 28 drives the first elastic driving member 60, the second elastic driving member 64, and the damper 18 to move. During this movement, when the combined force F of the two elastic driving members is located above the rotation center O of the driving lever 20, the combined force F provided by the two elastic driving members to the driving lever 20 changes from a force rotating counterclockwise to a force rotating the driving lever 20 clockwise. When the lower door hook 28 is pulled out, the driving lever 20 is actively rotated clockwise to an initial position, and the first and second elastic driving members 64 and damper 18 are restored to the initial state.

(I) Realization of a Smooth Closing Process of Slow Closing/Soft Closing:

As shown in FIG. 4, FIG. 63 to FIG. 65, the lower door hook 28 firstly contacts with the first arm 52 of the driving lever 20 at a certain initial speed. The lower door hook 28 forces the driving lever 20 to rotate counterclockwise around the rotational axis of the driving lever 20 by a predetermined angle, and then coincides with the rocking block 34. In the predetermined angle, the damper 18 does not act as a hindrance (i.e., the lower door hook 28 does not rebound significantly after collision with first arm 52 to prevent the lower door hook 28 from colliding back and forth in the gap between first arm 52 and second arm 54 and causing stagnation). At the same time, the combined force F of the two elastic driving members rotates below the rotation center O of the driving lever 20, and the second arm 54 of the driving lever 20 quickly contacts with the lower door hook 28.

As shown in FIG. 65, when the combined force F of the two elastic driving members is located below the rotation center O of the driving lever 20, the combined force F of the two elastic driving members becomes a force to rotate the driving lever 20 counterclockwise. The driving lever 20 drives the rocking block 34 to rotate together and drives the lower door hook 28 to move. At the same time, the upper door hook 26 extends into an upper through hole 90 of the front plate 51 and starts to press down the inclined block 30. The driving lever 20 trigger the monitoring switch. Then, the end of the lower door hook 28 touches the protruding post 56 of the contact arm 44 of the rotating lever 40, and the rotating lever 40 starts to rotate to trigger the secondary switch and the primary switch in turn (the secondary switch is stacked above the primary switch). At the same time, the end of the upper door hook 26 presses over a top of the inclined block 30, and the inclined block 30 begins to rise against an arc to a left side of the end of the upper door hook 26. The door is closed until the above movement stops.

(II) Realization of an Opening Process of Slow Closing/Soft Closing:

Referring to FIG. 66 to FIG. 68, and FIG. 4, the lower door hook 28 drives the driving lever 20 to rotate clockwise under a manual driving. Firstly, the lower door hook 28 is disengaged from the protruding post 56 of the contact arm 44 of the rotating lever 40, and the primary switch and the secondary switch are not connected in turn. Then the upper door hook 26 presses down the inclined block 30 and moves outward until the inclined block 30 is completely disengaged. The driving lever 20 is then disengaged from the monitoring switch. In this process, the combined force F of the two elastic driving members changes from a force forcing the driving lever 20 to rotate counterclockwise to a force rotating clockwise. When the lower door hook 28 is pulled out, the driving lever 20 rotates to the initial position actively. Finally, the first elastic driving member 60, the second elastic driving member 64, the inclined block 30, the rotating lever 40, and the damper 18 are restored to the initial state, and the door is opened.

(III) A Forced Closing Process:

As shown in FIG. 69, the door is not closed, but the driving lever 20 is triggered. At this time, the door body 12 can be strongly pushed to close the door, and the lower door hook 28 can return to a normal closed position. This is because the end of the lower door hook 28 can be forced through the gap between the second arm 54 of the driving lever 20 and the support 14 by the elastic deformation of the plastic. Two guide surfaces ensure a smooth forced closing.

Referring to FIG. 70 to FIG. 77, according to an embodiment of the present disclosure, the household appliance 100 includes a door body 12, a support 14, and a buffer assembly 16. The door body 12 is provided with a door hook. The door body 12 is connected to support 14 through rotating. The buffer assembly 16 is mounted at the support 14 and includes a restorable damper 18 and a driving lever 20 rotatably connected to the support 14. The damper 18 includes a body 22 fixed at the support 14, and a rod 24 is movably connected to body 22.

When the door body 12 is closed, the door hook is abutted against the driving lever 20 to press the rod 24. When the door body 12 is opened, the door hook is disengaged from the driving lever 20, the damper 18 is in a natural length state, and a gap is formed between the rod 24 and the driving lever 20.

In the household appliance 100, the restorable damper 18 is adopted, and the damper 18 and the driving lever 20 are no longer connected to each other. In this way, the rocking block can be omitted, which enables that the use of components is reduced, and a motion process is simplified. In addition, in the related art, the damper used is a unidirectional damper connected to the rocking block, and the unidirectional damper cannot automatically recover to an original length. In one embodiment, a position where the damper is connected to the rocking block has a small size, which allows that a performance requirement for the damper and costs are high. According to the household appliance 100 of the embodiments of the present disclosure, the restorable damper 18 is adopted. After an external force pressing the damper 18 is removed, the restorable damper 18 can be automatically restored to the original length without being connected to the driving lever 20 through the rocking block. Therefore, the damper 18 having lower costs can be adopted, to reduce costs of components and facilitating maintenance.

In an exemplary embodiment of the present disclosure, the household appliance 100 includes, but is not limited to, a microwave oven, an oven (including an electric oven, a microwave oven, and a micro-steaming and baking machine), a steam box, a dishwasher, a sterilization cabinet, and the like having the door body 12. In the embodiments of the present disclosure, the household appliance 100 is taken as an example of the microwave oven, which is for convenience of understanding the implementation of the present disclosure and should not be construed as a limitation of the present disclosure.

The door body 12 may be a dual-glazed door body 12, and the door body 12 may further be a wave-proof glass door body 12. One of benefits of using a glass door body 12 is that the glass is convenient for users to observe food inside the household appliance 100 from the outside. In addition, an outer surface of the door body 12 may be provided with a handle, which is convenient for the users to open or close the door.

The door hook may be made of metal materials or plastic materials, or different materials that are combined. The door hook as a whole is strip-shaped. A hook-shaped portion 86 is arranged at an end of the door hook, and may be conveniently snapped. A number of door hooks may be determined based on an actual situation. For example, the number of door hooks may be single, two, or more than two. In an embodiment of the present disclosure, the door hook includes two door hooks, namely an upper door hook 26 and a lower door hook 28 as shown in FIG. 12 and FIG. 13. In an embodiment, the upper door hook 26 and the lower door hook 28 may be joined to form an integral structural member fixed to the door body 12. In other embodiments, the upper door hook 26 and the lower door hook 28 may be separately fixed to the door body 12, which is not specifically limited.

During the closing of the door body 12, the lower door hook 28 receives a buffer force of the buffer assembly 16 to reduce door closing noise. That is, when the door body 12 closed, the lower door hook 28 abuts against the driving lever 20 to press the rod 24. When the door body 12 is opened, the lower door hook 28 is disengaged from the driving lever 20. The damper 18 is in a natural length state, and the gap is formed between the rod 24 and the driving lever 20. It should be understood that, in other embodiments, the upper door hook 26 may receive the buffer force of the buffer assembly 16 to reduce the door closing noise, or both the upper door hook 26 and the lower door hook 28 may receive the buffer force of the buffer assembly 16 to reduce the door closing noise, which is not specifically limited herein. In the following embodiments, the lower door hook 28 received the buffer force of the buffer assembly 16 is taken as an example.

Figure 40:
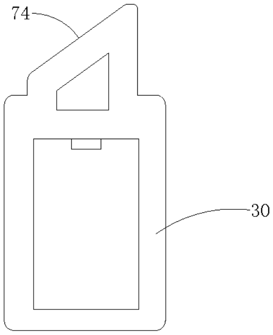
FIG. 40 to FIG. 41 are schematic views showing a structure of an inclined block according to the embodiments of the present disclosure.
Figure 41:
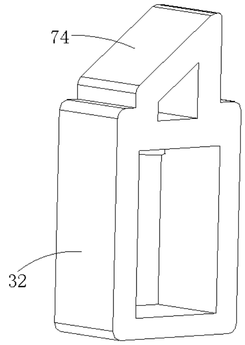
Figure 42:
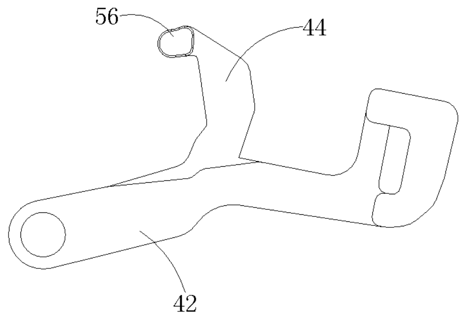
FIG. 42 to FIG. 45 are schematic views showing a structure of a rotating lever according to the embodiments of the present disclosure.
Figure 43:
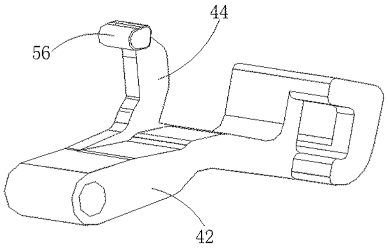
Figure 44:
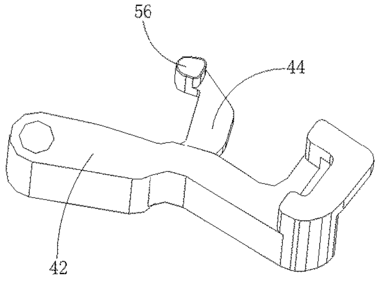
Figure 45:
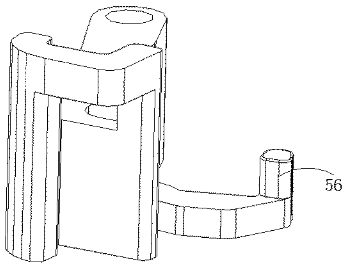
Figure 46:
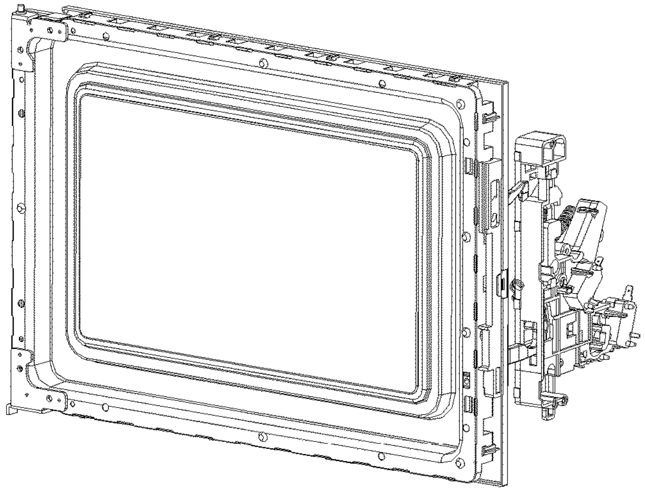
FIG. 46 to FIG. 49 are schematic views showing a first door closing process of a household appliance according to the embodiments of the present disclosure.
Figure 47:
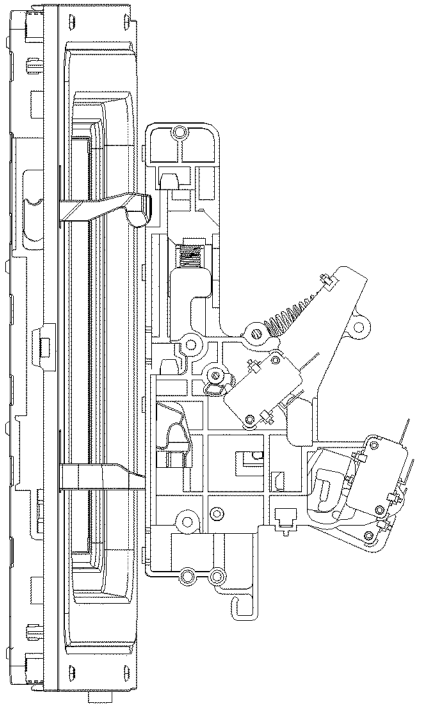
Figure 48:
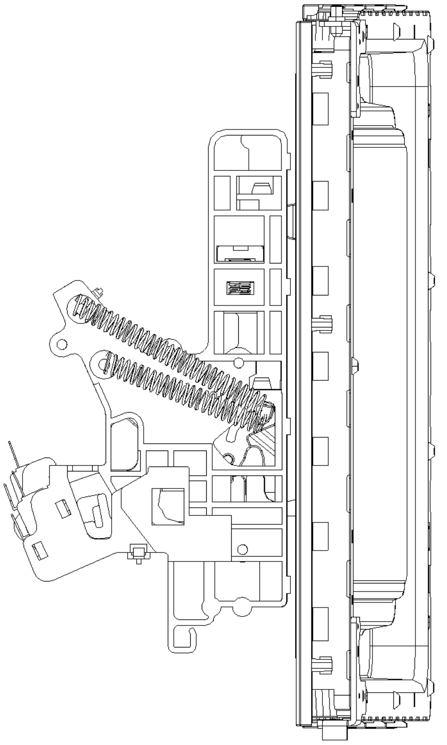
Figure 49:
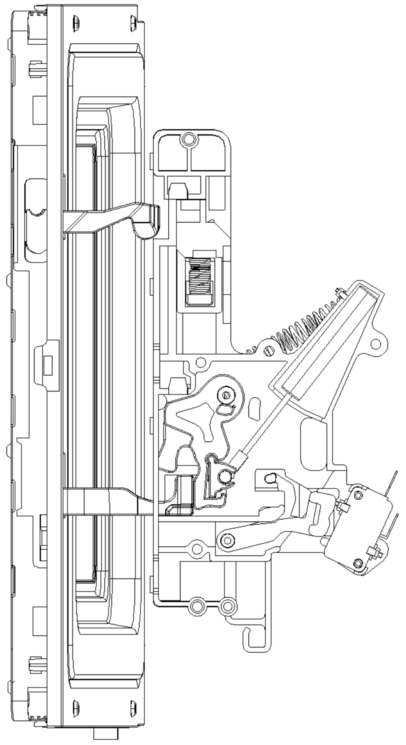
Figure 74:
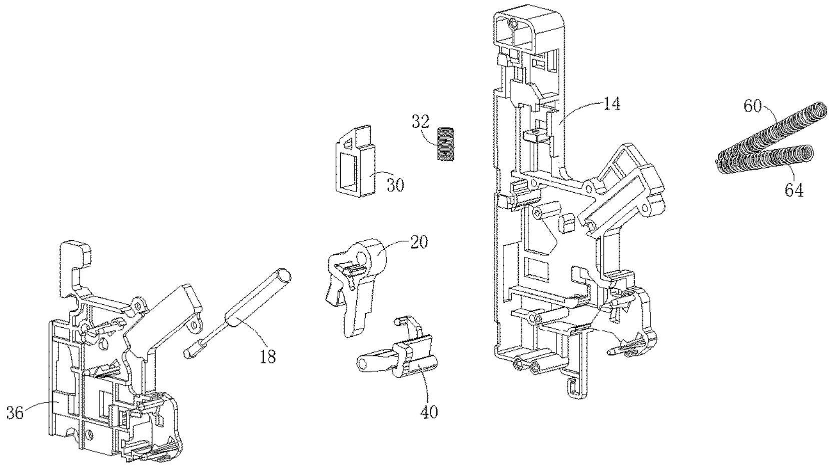
FIG. 74 is an exploded view showing a household appliance according to the embodiments of the present disclosure.
Figure 75:
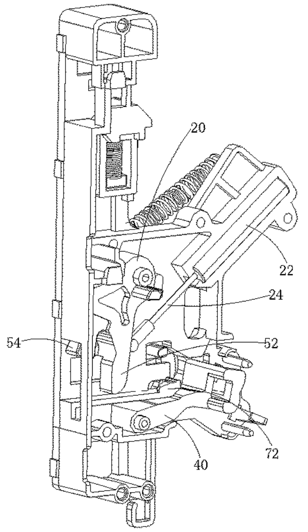
FIG. 75 to FIG. 77 are partial views showing a structure of a household appliance according to the embodiments of the present disclosure.
Figure 76:
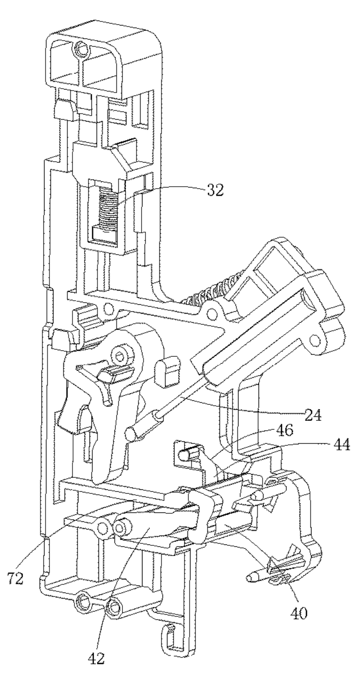

Referring to FIG. 74, FIG. 40, and FIG. 41, the household appliance 100 further includes an inclined block 30 and a compression spring 32, which are mounted at the support 14. The inclined block 30 has a receiving space, and the compression spring 32 is partially received in the receiving space. A top of the compression spring 32 abuts against a top wall of the receiving space, and a bottom of the compression spring 32 abuts against a support member extending into the receiving space at the support 14. The top of the inclined block 30 has an inclined surface 74 that slopes upward toward an interior of the support 14 in a vertical direction.

During the closing of the door body 12, an end of the upper door hook 26 abuts against the inclined surface 74 to lower the inclined block 30 to press the compression spring 32. When the end of the upper door hook 26 crosses the inclined surface 74, the inclined block 30 is caught by the upper door hook 26 under an action of the compression spring 32.

During the opening the door body 12, the upper door hook 26 presses the inclined block 30 and moves downwards, and the upper door hook 26 moves outwards until it is completely disengaged from the inclined block 30. The compression spring 32 resets the inclined block 30.

The household appliance 100 may include a cavity (not shown in the drawings). The support 14 may be fixed to the cavity, and the door body 12 is connected to the cavity through rotating. The cavity is provided with a chamber, and a front side of the cavity has an opening. the door body 12 is configured to close and open the opening. Food to be heated may be placed in the chamber.

The body 22 of the damper 18 is fixed at the support 14. During the opening and closing of the door body 12, the body 22 is fixed. During the closing of the door body 12, the lower door hook 28 pushes the driving lever 20 to rotate counterclockwise. After rotating by a certain angle (the gap between the driving lever 20 and the rod 24 is eliminated), the driving lever 20 contacts with the rod 24 and pushes the rod 24 to move inwardly toward the body 22. The body 22 provides damping force to the rod 24, reducing a closing speed of the door body 12, and in turn reducing the door closing noise. During the opening of the door body 12, the lower door hook 28 drives the driving lever 20 to rotate clockwise, and the rod 24 is driven by the body 22 to extend out of the body 22. Until the rod 24 is disengaged from the driving lever 20, the damper 18 returns to the natural length state. At this point, the damper 18 is in the natural length state. The damper 18 is in the natural length state, which can be understood as a state in which the damper 18 is in when there is no force on the rod 24 without damage to the damper 18, or when the force acting on the rod 24 is not sufficient to move the rod 24 inwardly toward the body 22.

Additionally, the gap is formed between the rod 24 and the driving lever 20 when the lower door hook 28 is disengaged from the driving lever 20. During the closing of the door body 12, the lower door hook 28 firstly contacts the driving lever 20 under a certain initial speed condition, and forces the driving lever 20 to rotate counterclockwise around the rotational axis of the driving lever 20. Due to the gap, the damper 18 does not act as a hindrance in this short process. Therefore, after the lower door hook 28 collides with the driving lever 20, the lower door hook 28 does not have obvious rebound, which can avoid the lower door hook 28 from colliding back and forth in the cavity of the driving lever 20 to cause stagnation.

Figure 83:
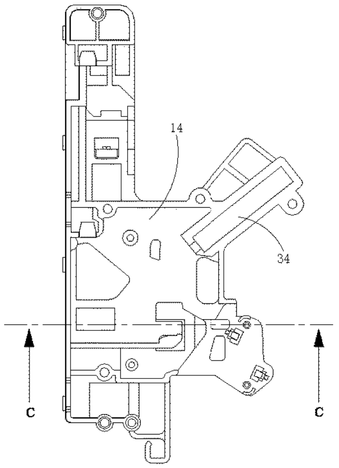
FIG. 83 to FIG. 88 are schematic views showing a structure of a support according to the embodiments of the present disclosure.
Figure 84:
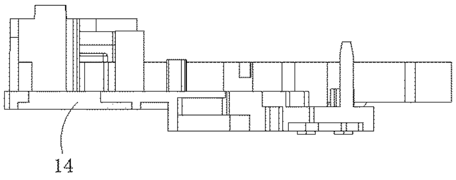

In some embodiments, referring to FIG. 83, the support 14 has a receiving groove 34. The body 22 is at least partially fixed at the receiving groove 34. In this way, the damper 18 is easier to mount.

In an exemplary embodiment of the present disclosure, the body 22 may be of a cylindrical shape. In an embodiment, the body 22 is at least partially fixed at the receiving groove 34. When the damper 18 is mounted, the body 22 can be placed into the receiving groove 34 at the support 14, which facilitates the mounting of the damper 18.

Referring to FIG. 70 and FIG. 79 to FIG. 82, the protective cover 36 is further arranged at the support 14, and the protective cover 36 has another receiving groove 34. The receiving groove 34 on the protective cover 36 can accommodate another part of the body 22. When the protective cover 36 is connected to the support 14, two receiving grooves 34 can enclose the body 22 to further fix the body 22. In an embodiment, the support 14 and protective cover 36 may be connected in a snap manner.

Figure 85:
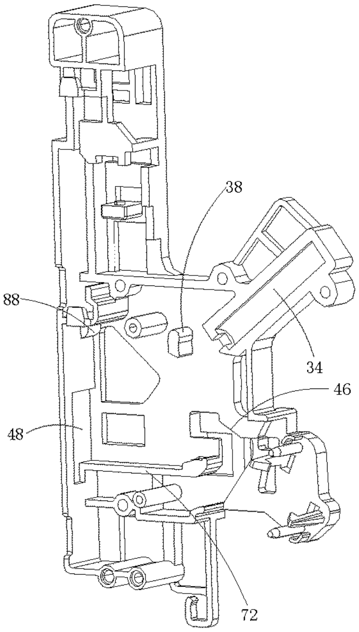

In some embodiments, as shown in FIG. 85, the support 14 is provided with a limit post 38. The limit post 38 is configured to be abutted against the driving lever 20 and limits a rotation of the driving lever 20 when the door body 12 is closed. In this way, a rotation range of the driving lever 20 can be limited, and damage to the driving lever 20 can be prevented.

In an exemplary embodiment of the present disclosure, a position of the limit post 38 is set to allow the driving lever 20 not rotate beyond the position of limit post 38. This position is a position to which the driving lever 20 is rotated after the door is closed.

In some embodiments, the support is provided with a switch. The buffer assembly 16 further includes a rotating lever 40 rotatably connected to the support 14. When the door body 12 is closed, the door hook is abutted against the rotating lever 40 to trigger the switch by the rotating lever 40. In this way, the addition of rotating lever 40, on the one hand, can meet the safety requirements, on the other hand, can further reduce the door closing noise.

In an exemplary embodiment of the present disclosure, some household appliances 100 require the door body 12 to be closed before the household appliance 100 is allowed to operate. For example, after the door body 12 is closed, the microwave oven is allowed to emit microwaves into the cavity to heat food, which can prevent leakage from occurring when the door is not closed.

When the door body 12 is closed, the lower door hook 28 abuts against the rotating lever 40 to trigger the switch by the rotating lever 40. In this way, a control board of the household appliance 100 obtains a relevant trigger signal and controls the household appliance 100 to operate to meet the safety requirements.

During the closing of the door body 12, the lower door hook 28 approaches the rotating lever 40. When the lower door hook 28 abuts against the rotating lever 40, the rotating lever 40 may be driven to rotate clockwise. In this process, the lower door hook 28 and the door body 12 may be decelerated, to further reduce the door closing noise.

Figure 88:
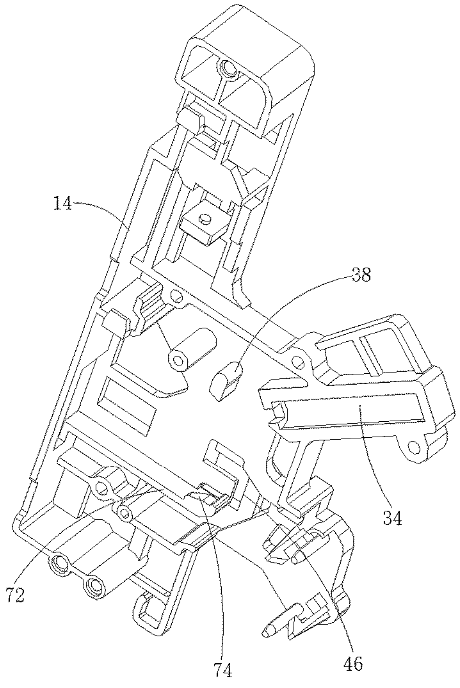
Figure 89:
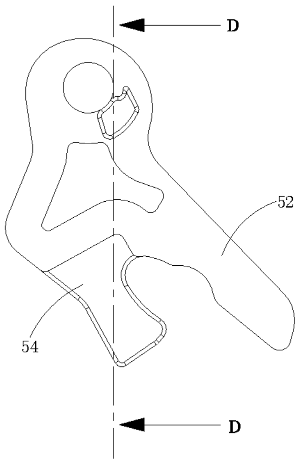
FIG. 89 to FIG. 94 are schematic views showing a structure of a driving lever according to the embodiments of the present disclosure.
Figure 90:
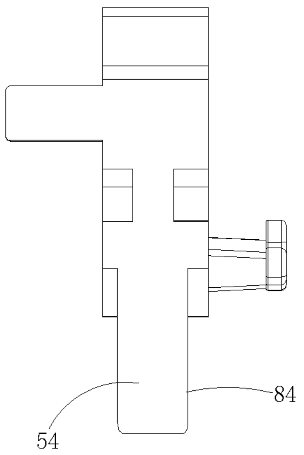
Figure 91:
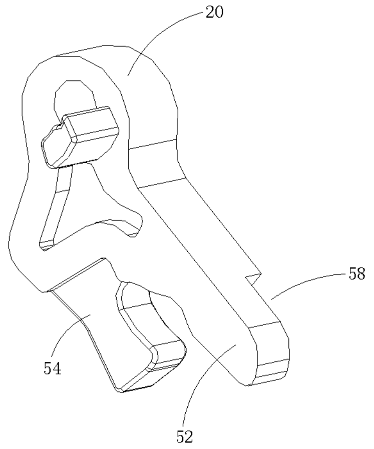
Figure 92:
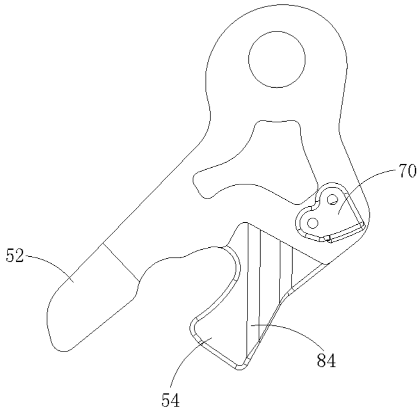
Figure 93:
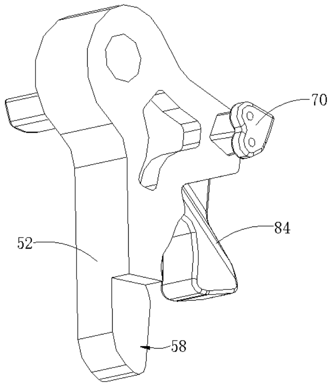
Figure 94:
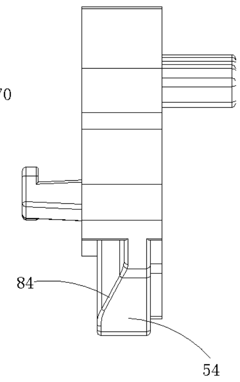
Figure 95:
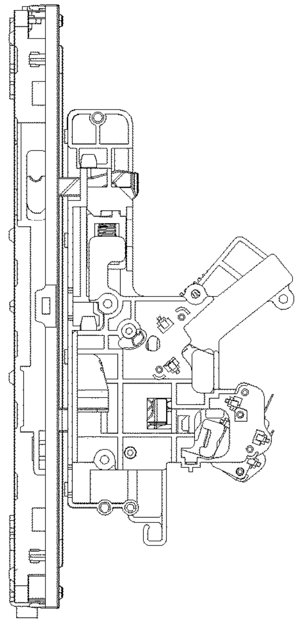
FIG. 95 to FIG. 97 are schematic views showing a door closed state (of dual elastic driving members) of a household appliance according to the embodiments of the present disclosure.
Figure 96:
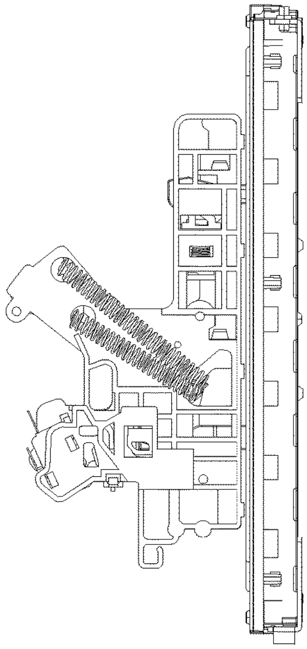

In some embodiments, referring to FIG. 42 to FIG. 45, the rotating lever 40 includes a rotating arm 42 rotatably connected to the support 14 and a contact arm 44 connected to the rotating arm 42. Referring to FIG. 88, the support 14 has a groove 46, and the contact arm 44 is at least partially located in the groove 46. The contact arm 44 is configured to trigger the switch. In this way, the rotating lever 40 can be protected from artificial triggers, which meets the safety requirements.

In an exemplary embodiment of the present disclosure, the contact arm 44 is away from a rotational axis of the rotating arm 42. During the closing of the door body 12, the lower door hook 28 may extend into the support 14 through a lower through hole 48 of a front plate 51 connected to the support 14 and push the contact arm 44 to rotate, to drive the whole rotating lever 40 to rotate. The contact arm 44 is at least partially located in the groove 46, which prevents an external thin rod or the like from extending into the support 14 through the lower through hole 48 to push the contact arm 44 to rotate and artificially trigger the switch. In this way, the household appliance 100 mistakenly believes that the door body 12 is closed, and then activates the appliance to cause the safety problem.

In addition, a projection 50 is further arranged at an inner side of the protective cover 36, and a shape of the projection 50 engages with a shape of the groove 46 to enclose the contact arm 44, further ensuring that the contact arm 44 is not triggered by mistake. In this case, a rotation of the contact arm 44 can be more stable.

In some embodiments, referring to FIG. 89 to FIG. 94, the driving lever 20 includes a first arm 52 and a second arm 54 spaced apart from each other. The door hook is configured to move, during the closing of the door body 12, through the second arm 54 below the second arm 54 to be abutted against the first arm 52, driving the driving lever 12 to rotate. The contact arm 44 is provided with a protruding post 56. The first arm 52 has a notch 58 and is configured to avoid the protruding post 56 by means of the notch 58 during the closing of the door body 12. In this way, the contact arm 44 of the rotating lever 40 can be ensured to pass smoothly without interference.

Figure 73:
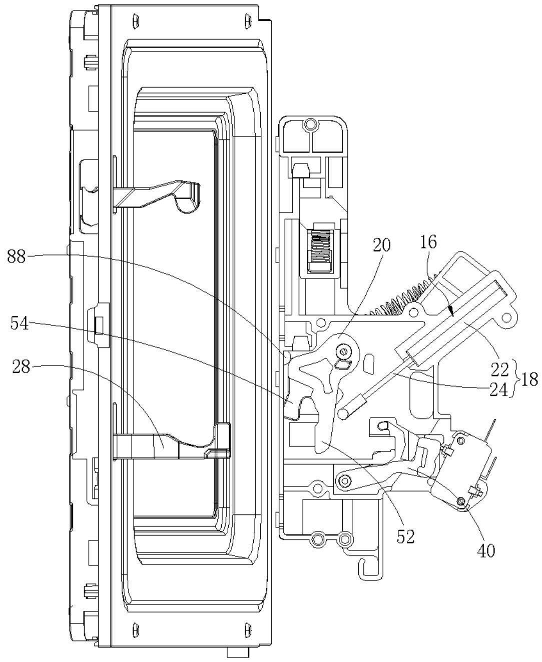
Figure 97:
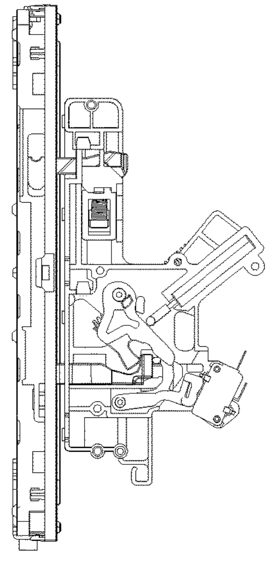

In an exemplary embodiment of the present disclosure, referring to FIG. 73, the first arm 52 and second arm 54 are located at a left side of the protruding post 56 when the door body 12 is opened. The first arm 52 is relatively long. During the closing of the door body 12, the lower door hook 28 moves below the second arm 54 and enters a space between the first arm 52 and the second arm 54. Then the lower door hook 28 abuts against the first arm 52 to drive the rotating lever 40 to rotate counterclockwise. In a process of rotating the driving lever 20, the second arm 54 is caught by the lower door hook 28, which enables that the driving lever 20 drives the lower door hook 28 to continue closing the door. The first arm 52 rotates toward the protruding post 56. By providing the notch 58, when the first arm 52 passes by, the first arm 52 does not interfere with the protruding post 56. In this way, the lower door hook 28 can abut against the protruding post 56 and drive the rotating lever 40 to rotate clockwise. The door body 12 can be closed smoothly, and the switch can be triggered smoothly. After the door body 12 is closed, an end of the lower door hook 28 and the protruding post 56 are located in the space between the first arm 52 and the second arm 54, as shown in FIG. 97.

Figure 72:
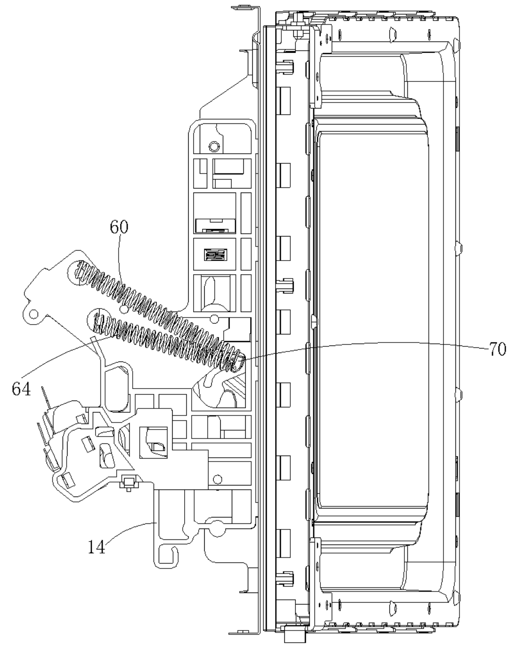
Figure 77:
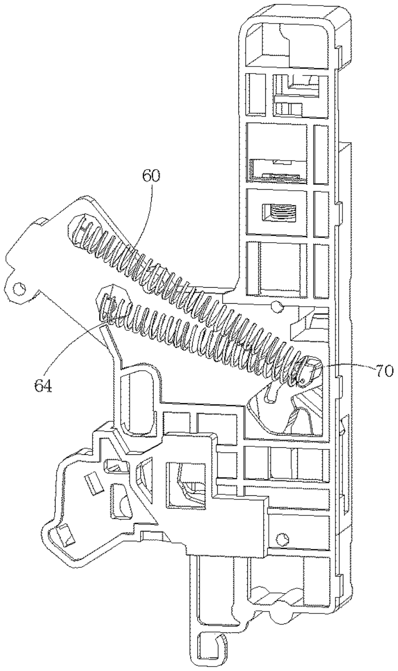
Figure 78:
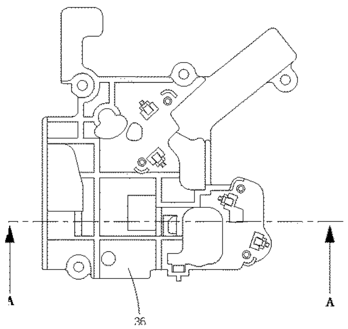
FIG. 78 to FIG. 82 are schematic views showing a structure of a protective cover according to the embodiments of the present disclosure.
Figure 79:
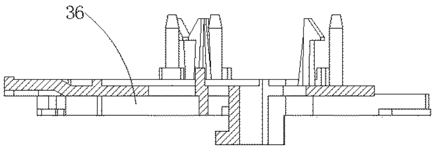
Figure 80:
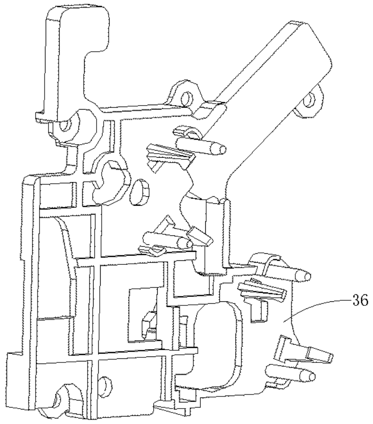
Figure 81:
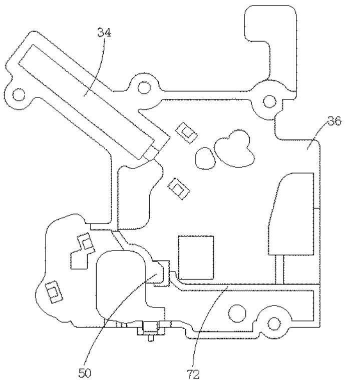
Figure 86:
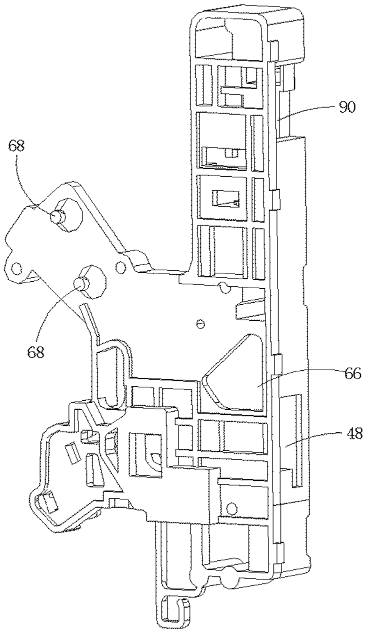
Figure 87:
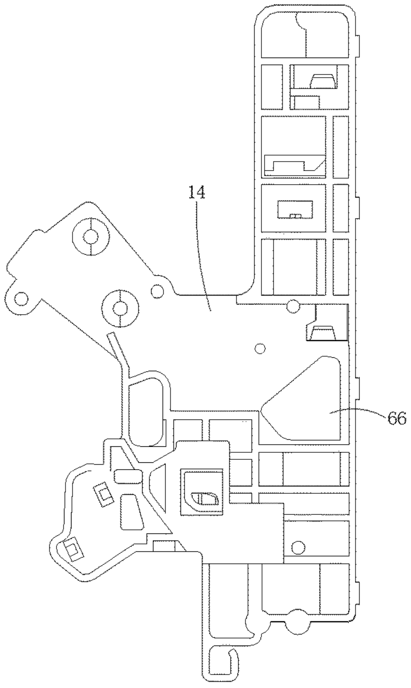

Referring to FIG. 72 and FIG. 77, in an embodiment, the buffer assembly 16 further includes two elastic driving members: a first elastic driving member 60 and a second elastic driving member 64 form an acute angle. The elastic driving member and the driving lever 20 are located at opposite sides of the support 14, and the support 14 has a through hole 66. As shown in FIG. 86 and FIG. 87, the driving lever 20 is connected to the two elastic driving members through the through hole 66. The two elastic driving members are configured to drive the driving lever 20 to accelerate rotating, which enables that the driving lever 20 drives the door body 12 to accelerate. In this way, a process of first accelerating and then decelerating of the lower door hook 28 can be realized.

Figure 99:
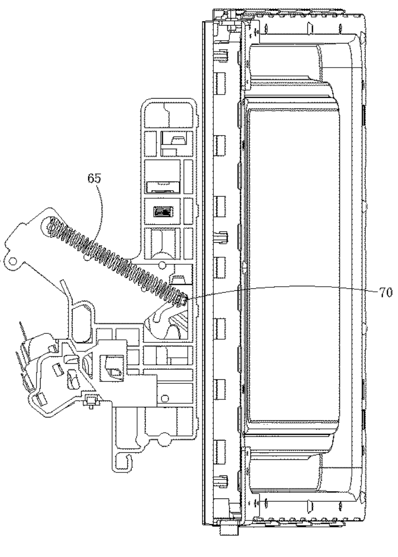
FIG. 99 to FIG. 100 are partial views showing a structure of a household appliance according to the embodiments of the present disclosure.
Figure 100:
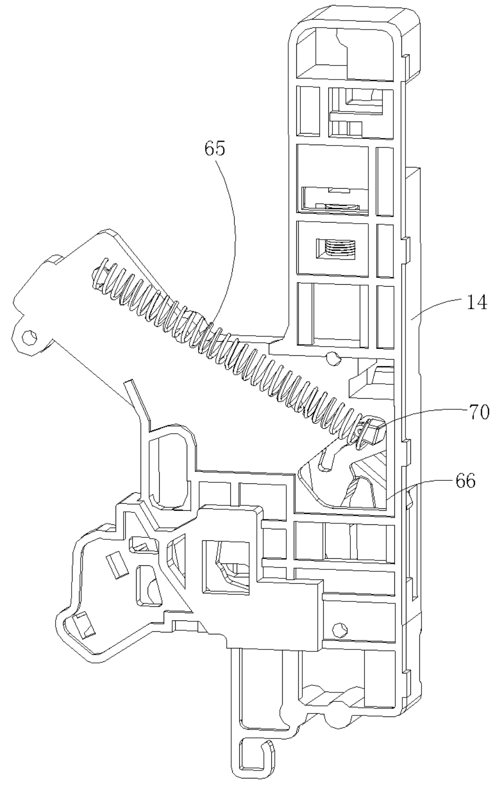

Referring to FIG. 99 and FIG. 100, in an embodiment, the buffer assembly 16 includes a single elastic driving member 65. The single elastic driving member 65 and the driving lever 20 are located at opposite sides of the support 14. The support 14 has a through hole 66. The driving lever 20 is connected to the single elastic driving member 65 through the through hole 66. The single elastic driving member 65 is configured to drive the driving lever 20 to accelerate rotating, which enables that the driving lever 20 drives the door body 12 to accelerate. In this way, a process of first accelerating and then decelerating of the lower door hook 28 can be realized.

In illustrated embodiments, the elastic driving member is a driving spring. In other embodiments, the elastic driving member may further be an elastic member with other structures, which is not limited to a spring.

It should be understood that, in other embodiments, a number of elastic driving members included in the buffer assembly 16 is not limited to two, a single, but may be other numbers of elastic members, which is not specifically limited herein.

The elastic driving member and the driving lever 20 that are located at opposite sides of the support 14 can disperse relevant structural members to avoid space reduction and excessive weight concentration caused by too many structural members at the same side of the support 14, which is unfavorable to an allocation of the structural members.

The elastic driving member may provide a pulling force to the driving lever 20 to allow the driving lever 20 to accelerate the lower door hook 28, or may provide a pushing force to the driving lever 20 to allow the driving lever 20 to accelerate the lower door hook 28. In the embodiment, the elastic driving member may provide a pulling force to the driving lever 20 to allow the driving lever 20 to accelerate the lower door hook 28.

Since the driving lever 20 can drive the lower door hook 28 to accelerate, the door body 12 can be closed by a force of the driving lever 20 during an acceleration stage. During acceleration of the lower door hook 28, the damper 18 is pressed when the driving lever 20 rotates. As the door closing process continues, the driving lever 20 continues to press the rod 24 of the damper 18. A press amount of the damper 18 increases, and the damping force provided by damper 18 also increases. When the damping force provided by the damper 18 is greater than the driving force provided by the elastic driving member, the lower door hook 28 begins to decelerate. Therefore, the noise when the door body 12 is closed is not too loud during a deceleration stage. In the embodiments of the present disclosure, the body 22 is fixed when the rod 24 of the damper 18 is pressed.

The first elastic driving member 60 is located above the second elastic driving member 64. Referring to FIG. 86, one end of the first elastic driving member 60 hooks the positioning post 68 at the support 14, and another end of the first elastic driving member 60 hooks the connection portion 70 at the driving lever 20. One end of the second elastic driving member 64 hooks another positioning post 68 at the support 14, and another end of the second elastic driving member 64 hooks the connection portion 70. The angle formed by the first elastic driving member 60 and the second elastic driving member 64 is an acute angle, and the angle may be 10 degrees, 30 degrees, 50 degrees, 70 degrees, or any other angle, which is not specifically limited herein.

It should be understood that, in other embodiments, a number of elastic driving members included in the buffer assembly 16 is not limited to two, a single, but may be other numbers of elastic members, which is not specifically limited herein.

In some embodiments, referring to FIG. 85, the support 14 is further provided with a block 72 blocking at least a part of the rotating arm 42. In this way, the rotating lever 40 can be protected from artificial triggers and meets the safety requirements.

In an exemplary embodiment of the present disclosure, the lower door hook 28 may extend into the support 14 through the lower through hole 48 in the support 14 during the closing of the door body 12, and push the contact arm 44 to rotate, to drive the whole rotating lever 40 to rotate. By arranging the block 72, the block 72 blocks at least a part of the rotating arm 42, which can prevent an external thin rod or the like from penetrating into the support 14 from the lower through hole 48 to push the rotating arm 42 to rotate and trigger the switch artificially. Therefore, the household appliance 100 mistakenly thinks that the door body 12 is closed, and then activates the appliance to cause the safety problem.

Figure 82:
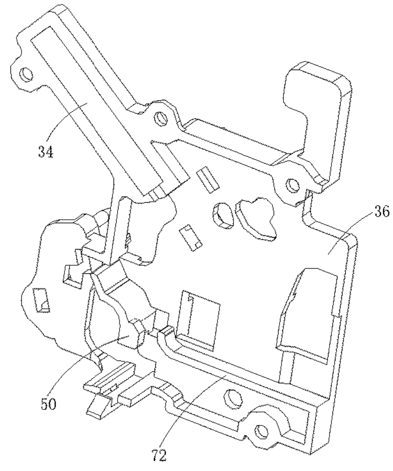

In addition, referring to FIG. 82, another block 72 is further arranged at the inner side of the protective cover 36. A shape of the block 72 at the support 14 matches a shape of the block 72 at the protective cover 36, allowing to completely block the rotating arm 42 and further ensure that the rotating arm 42 will not be triggered by mistake.

It should be understood that, in other embodiments, the block 72 at the support 14 may fully block the rotating arm 42.

In some embodiments, a top surface of block 72 has an inclined surface 74. The inclined surface 74 is configured to guide the door hook to be abutted against the contact arm 44 during the closing of the door body 12. In this way, the door hook can be ensured to enter a normal position during the closing of the door body 12 and to contact with the rotating lever 40.

In an exemplary embodiment of the present disclosure, the lower door hook 28 moves toward the rotating lever 40 during the closing of door body 12. When the lower door hook 28 reaches the inclined surface 74, the inclined surface 74 guides an end of lower door hook 28 towards the contact arm 44, enabling the lower door hook 28 to contact with the protruding post 56 of the contact arm 44. The lower door hook 28 drives the rotating lever 40 to allow the rotating lever 40 to trigger the switch when the lower door hook 28 continues to move.

In some embodiments, the door hook includes the lower door hook 28. The support 14 is provided with a first switch 76, and the switch includes a second switch 78 and a third switch 80.

The buffer assembly 16 is configured such that, during the closing of the door body 12, the driving lever 20 is driven by the lower door hook 28 to trigger the first switch 76. The rotating lever 40 is driven by the lower door hook 28 to trigger the second switch 78 and the third switch 80 sequentially. In this way, after the driving lever 20 triggers the first switch 76, the rotating lever 40 sequentially triggers the second switch 78 and the third switch 80, which enables that the first switch 76, the second switch 78, and the third switch 80 are triggered in sequence, thereby avoiding a problem of switch trigger sequence confusion.

In an exemplary embodiment of the present disclosure, the household appliance 100 may include a microwave oven including the first switch 76, the second switch 78, and the third switch 80. The first switch 76 may be a monitoring switch configured to monitor a whole microwave oven loop. The second switch 78 may be a secondary switch configured to control the turning on of lights and cooling fans or other components. The third switch 80 may be a primary switch configured to control a microwave function of the microwave oven. During the closing of the door body 12, the first switch 76, the second switch 78, and the third switch 80 are sequentially triggered to generate corresponding electrical signals, which enables that a control panel of the microwave oven can control an operation of the microwave oven.

During using the microwave oven, a trigger sequence of three switches is particularly important. During the closing of the door, the trigger sequence should be: first triggering the monitoring switch, second triggering the secondary switch, and last triggering the primary switch. In this way, use safety can be guaranteed and the safety requirements can be met.

It should be understood that, in other embodiments, a number of switches is not limited to three, and other numbers of switches are also possible. The number of switches and the trigger sequence are set based on the actual conditions, which are not specifically limited herein.

In some embodiment, the door hook has an end having a first guide surface 82.

Referring to FIG. 89 to FIG. 94, the driving lever 20 includes a first arm 52 and a second arm 54 spaced apart from each other, and the second arm 54 has a second guide surface 84 at a side surface of the second arm 54. During the closing of the door body 12, the first guide surface 82 is cooperatively connected to the second guide surface 84 to allow the door hook to be caught by the second arm 54 after an end of the door hook moves through the second arm 54. Thus, during the closing of the door body 12, the first guide surface 82 is cooperatively connected to the second guide surface 84, which enables that, after the end of the door hook moves through the second arm 54, the second arm 54 is caught by the door hook, thereby realizing a forced door closing structure design. When the driving lever 20 is triggered abnormally, the appliance can be repaired without disassembly, and users can force the door to close and return the appliance to normal by themselves.

In an exemplary embodiment of the present disclosure, referring to FIG. 22 to FIG. 27, a hook-shaped portion 86 is arranged at the end of the lower door hook 28, and the hook-shaped portion 86 is configured to be easily engaged. The lower door hook 28 includes a first guide surface 82 arranged at the hook-shaped portion 86. In this way, the users may force the door to close, and the lower door hook 28 and the driving lever 20 can return to a normal mating position.

When the door is closed normally, the lower door hook 28 contacts with the first arm 52 of the driving lever 20 under a certain initial speed condition, and the lower door hook 28 can rotate the driving lever 20. The driving lever 20 triggers the first switch 76 after the driving lever 20 rotates, and then the second arm 54 of the driving lever 20 is caught by the lower door hook 28 to drive the lower door hook 28 to continue closing the door. The lower door hook 28 abuts against the contact arm 44 to rotate the rotating lever 40.

Figure 98:
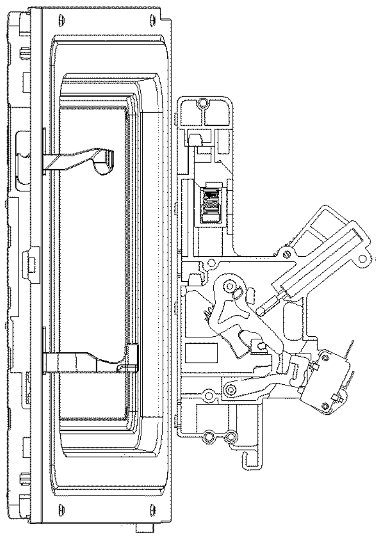
FIG. 98 is a schematic view showing a state of a driving lever after an abnormal trigger according to the embodiments of the present disclosure.

However, in real life, it is easy to force the driving lever 20 to be triggered (as shown in FIG. 98) because of abnormal means used by users or children, such as using a bamboo stick, finger or other slender object to insert into the support 14 to toggle the driving lever 20, which forces the driving lever 20 to be triggered. Therefore, the driving lever 20 rotates, and the lower door hook 28 cannot engages with the driving lever 20, which causes the door body 12 to fail to close and the household appliance 100 to lose function and even needs to be disassembled for maintenance. According to the household appliance 100 of the embodiments of the present disclosure, the end of the lower door hook 28 has the first guide surface 82, and the driving lever 20 includes the second guide surface 84. The first guide surface 82 is cooperatively connected to the second guide surface 84 to allow the door hook to be caught by the second arm 54 after the end of the door hook moves through the second arm 54. The user can restore a normal cooperation relationship between the lower door hook 28 and the driving lever 20 by using a relatively large force, which is no need to disassemble the appliance for maintenance.

In an embodiment, the end of low door hook 28 may be forced through a gap between the second arm 54 of the drive lever 20 and the support 14 by the elastic deformation of the plastic. The first guide surface 82 and the second guide surface 84 may be guided inclined surfaces.

A principle process of opening and closing the door according to the embodiments of the present disclosure will be described below.

In an embodiment with dual elastic driving members, descriptions of an initial state and a final state: At an initial time (when the door is not closed), the two elastic driving members connect to the support 14 and the driving lever 20, and the combined force of the two elastic driving members is located above the rotational axis of the driving lever 20. In this case, a force (combined force) of the elastic driving member forces the driving lever 20 to have a clockwise rotation tendency, and the two elastic driving members are always in a stretched state. At the same time, the driving lever 20 is restrained from moving clockwise by a stop post 88 on the support 14. The compression spring 32 is always in a compressed state. The rod 24 of the damper 18 and the driving lever 20 are not in direct contact with each other, and a gap is formed between the rod and the driving lever 20. At a final time (the time after the door is opened), the lower door hook 28 pulls the driving lever 20 to move outward, and drives the first elastic driving member 60 and the second elastic driving member 64 to move. During this movement, when the combined force of the two elastic driving members is located above the rotational axis of the driving lever 20, the force provided by the two elastic driving members to the driving lever 20 changes from a force rotating counterclockwise to a force rotating the driving lever 20 clockwise. When the lower door hook 28 is pulled out, the driving lever 20 is rotated clockwise to an initial position, and the first and second elastic driving members 64 and damper 18 are restored to the final state. As the damper 18 rotates clockwise with the driving lever 20, the rod 24 extends together until returning to an original length.

In an embodiment with a single elastic driving member, descriptions of an initial state and a final state: At an initial time (when the door is not closed), the single elastic driving member connects to the support 14 and the driving lever 20, and a force of the single elastic driving member is located above the rotational axis of the driving lever 20. In this case, the force of the elastic driving member forces the driving lever 20 to have a clockwise rotation tendency, and the elastic driving member is always in a stretched state. At the same time, the driving lever 20 is restrained from moving clockwise by the a stop post 88 on the support 14. The compression spring 32 is always in a compressed state. The rod 24 of the damper 18 and the driving lever 20 are not in direct contact with each other, and a gap is formed between the rod and the driving lever 20. At a final time (the time after the door is opened), the lower door hook 28 pulls the driving lever 20 to move outward, and drives the single elastic driving member to move. During this movement, when the force of the single elastic driving member is located above the rotational axis of the driving lever 20, the force provided by the single elastic driving member to the driving lever 20 changes from a force rotating counterclockwise to a force rotating the driving lever 20 clockwise. When the lower door hook 28 is pulled out, the driving lever 20 is rotated clockwise to an initial position, and the single elastic driving member and damper 18 are restored to the final state. As the damper 18 rotates clockwise with the driving lever 20, the rod 24 extends together until returning to an original length.

(I) Realization of a Smooth Closing Process of Slow Closing/Soft Closing:

As shown in FIG. 70, and FIG. 95 to FIG. 97, in an embodiment with dual elastic driving members, the lower door hook 28 firstly contacts with the first arm 52 of the driving lever 20 first at a certain initial speed. The lower door hook 28 forces the driving lever 20 to rotate counterclockwise around the rotational axis of the driving lever 20 by a certain angle. During this angle, the damper 18 does not act as a hindrance (i.e., the lower door hook 28 does not rebound significantly after collision with first arm 52 to prevent the lower door hook 28 from colliding back and forth in the gap between first arm 52 and second arm 54 and causing stagnation). At the same time, the combined force of the two elastic driving members rotates below the rotational axis of the driving lever 20, and the second arm 54 of the driving lever 20 quickly contacts with the lower door hook 28. When the combined force of the two elastic driving members is located below the rotational axis of the driving lever 20, the combined force of the two elastic driving members becomes a force to rotate the driving lever 20 counterclockwise and drives the lower door hook 28 to move. The driving lever 20 begins to contact with the damper 18, and the damping begins to work. At the same time, the upper door hook 26 extends into an upper through hole 90 of the front plate 51 and begins to press down the inclined block 30. The driving lever 20 triggers the monitoring switch. Then, the end of the lower door hook 28 touches the protruding post 56 of the contact arm 44 of the rotating lever 40, and the rotating lever 40 starts to rotate to trigger the secondary switch and the primary switch in turn (the secondary switch is stacked above the primary switch). At the same time, the end of the upper door hook 26 presses over a top of the inclined block 30, and the inclined block 30 begins to rise against an arc to a left side of the end of the upper door hook 26. The door is closed until the above movement stops.

Figure 70:
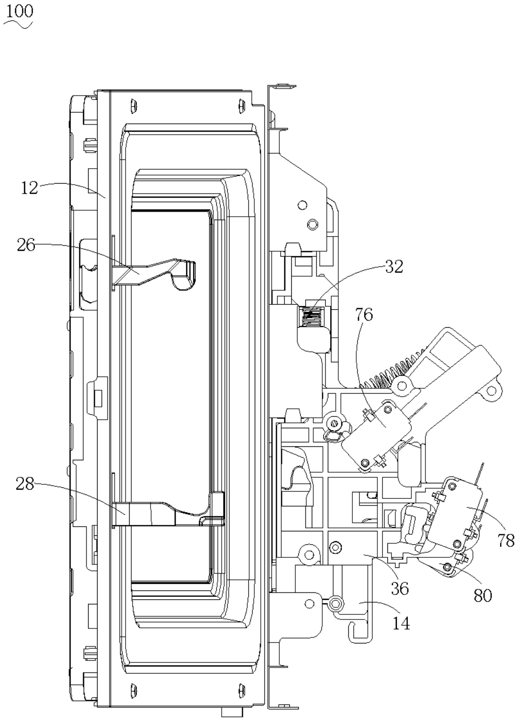
FIG. 70 to FIG. 73 are partial views showing a structure of a household appliance according to the embodiments of the present disclosure.
Figure 71:
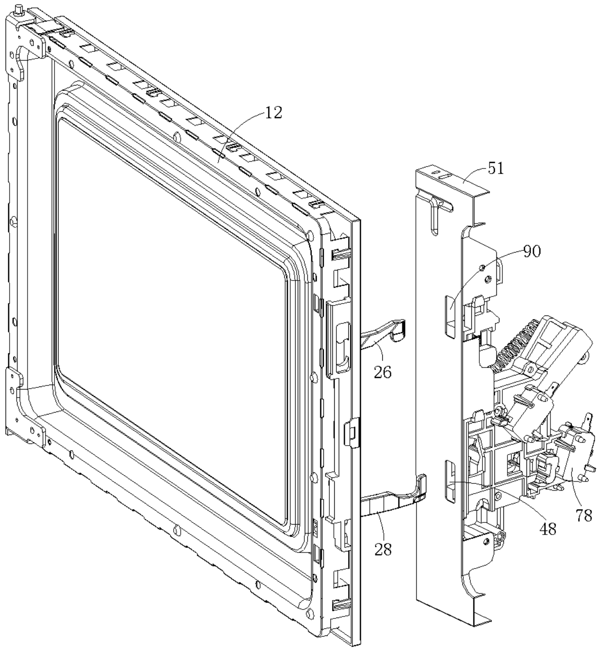
Figure 101:
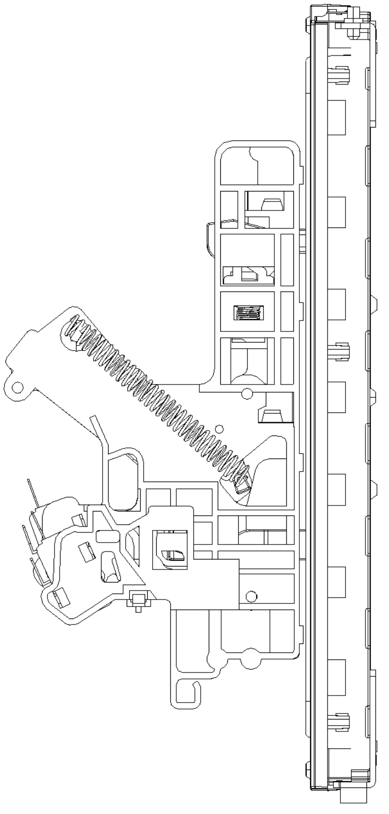
FIG. 101 is a schematic view showing a door closed state (of a single elastic driving member) of a household appliance according to the embodiments of the present disclosure.

Referring to FIG. 70 and FIG. 101, in an embodiment with a single elastic driving member, the lower door hook 28 first contacts with the first arm 52 of the driving lever 20 at a certain initial speed, and forces the driving lever 20 to rotate counterclockwise around the rotational axis of the driving lever 20 by a certain angle. During this angle, damper 18 does not act as a hindrance (i.e., the lower door hook 28 does not rebound significantly after collision with first arm 52 to prevent the lower door hook 28 from colliding back and forth in the gap between first arm 52 and second arm 54 and causing stagnation). At the same time, a force of the single elastic driving member rotates below the rotational axis of the driving lever 20, and the second arm 54 of the driving lever 20 quickly contacts with the lower door hook 28. When the force of the single elastic driving member is located below the rotational axis of the driving lever 20, the force of the single elastic driving member becomes a force to rotate the driving lever 20 counterclockwise and drives the lower door hook 28 to move. The driving lever 20 begins to contact with the damper 18, and the damping begins to work. At the same time, the upper door hook 26 extends into an upper through hole 90 of the front plate 51 and begins to press down the inclined block 30. The driving lever 20 trigger the monitoring switch. Then, the end of the lower door hook 28 touches the protruding post 56 of the contact arm 44 of the rotating lever 40, and the rotating lever 40 starts to rotate to trigger the secondary switch and the primary switch in turn (the secondary switch is stacked above the primary switch). At the same time, the end of the upper door hook 26 presses over a top of the inclined block 30, and the inclined block 30 begins to rise against an arc to a left side of the end of the upper door hook 26. The door is closed until the above movement stops.

(II) Realization of an Opening Process of Slow Closing/Soft Closing:

Referring to FIG. 95 to FIG. 97, FIG. 101, and FIG. 70, the lower door hook 28 drives the driving lever 20 to rotate clockwise under a manual driving. Firstly, the lower door hook 28 is disengaged from the protruding post 56 of the contact arm 44 of the rotating lever 40, and the primary switch and the secondary switch are not connected in turn. Then the upper door hook 26 presses down the inclined block 30 and moves outward until the inclined block 30 is completely disengaged. The driving lever 20 is then disengaged from the monitoring switch. In this process, the combined force of the two elastic driving members changes from a force forcing the driving lever 20 to rotate counterclockwise to a force rotating clockwise. When the lower door hook 28 is pulled out, the driving lever 20 rotates to the initial position actively. Finally, the first elastic driving member 60, the second elastic driving member 64, the inclined block 30, the rotating lever 40, and the damper 18 are restored to the initial state, and the door is opened.

(III) A Forced Closing Process:

As shown in FIG. 98, the door is not closed, but the driving lever 20 is triggered. At this time, the door body 12 can be strongly pushed to close the door, and the lower door hook 28 can return to a normal closed position. This is because the end of the lower door hook 28 can be forced through the gap between the second arm 54 of the driving lever 20 and the support 14 by the elastic deformation of the plastic. Two guide surfaces ensure a smooth forced closing.

In the description of this specification, descriptions with reference to the terms "an embodiment", "some embodiments", "certain embodiments", "illustrative embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described, various changes, modifications, replacements, and variations can be made to these embodiments without departing from the principles and spirit of the present disclosure. The scope of the present disclosure shall be defined by the claims as appended and their equivalents.

What is claimed is:

1. A household appliance, comprising:
- a bracket;
- a door body connected to the bracket through rotating and provided with a door hook; and
- a buffer assembly mounted at the bracket and comprising a first elastic driving member, a second elastic driving member, a damper, and a driving lever, the damper being movably connected to the driving lever, the driving lever being provided with a connection portion, and the first elastic driving member and the second elastic driving member being connected to the connection portion, wherein:
- in response to the door body being open, the door hook is disengaged from the driving lever, an angle between the first elastic driving member and a first connecting line ranging from 0 degree to 60 degrees, an angle between the second elastic driving member and a second connecting line ranging from 0 degree to 60 degrees, wherein the first connecting line is between a rotation center of the driving lever and a first connection between the first elastic driving member and the connection portion, and the second connecting line is between the rotation center of the driving lever and a second connection between the second driving elastic portion and the connection portion;
- in response to the door body being close, the door hook is abutted against the driving lever and the driving lever presses the damper;
- the buffer assembly further comprises a rotating lever;
- the bracket is provided with a switch, the rotating lever being rotatably connected to the bracket; and
- in response to the door body being close, the switch is triggered by the rotating lever through abutting the door hook against the rotating lever.

2. The household appliance according to claim 1, wherein an angle between the first elastic driving member and the second elastic driving member ranges from 7 degrees to 110 degrees in response to the door body being open.

3. The household appliance according to claim 1, wherein:
- a combined force of the first elastic driving member and the second elastic driving member on the driving lever acts above the rotation center of the driving lever in response to the door body being open, and
- the combined force of the first elastic driving member and the second elastic driving member on the driving lever acts below the rotation center of the driving lever in response to the door body being close.

4. The household appliance according to claim 1, wherein in response to the door body being open, the first elastic driving member applies torque to the driving lever for rotating the driving lever in a first direction with a tangential component force of the first elastic driving member, and the second elastic driving member is configured to apply torque to the driving lever for rotating the driving lever in a second direction with a tangential component force of the second elastic driving member, the second direction being opposite to the first direction, and the torque applied by the first elastic driving member being greater than the torque applied by the second elastic driving member.

5. The household appliance according to claim 4, wherein in response to the door body being close, the first elastic driving member applies torque to the driving lever for rotating the driving lever in a second direction with a tangential component force of the first elastic driving member, and the second elastic driving member applies torque to the driving lever for rotating the driving lever in the second direction with a tangential component force of the second elastic driving member, the torque applied by the second elastic driving member being greater than the torque applied by the first elastic driving member.

6. The household appliance according to claim 1, wherein:
- the rotating lever comprises a rotating arm rotatably connected to the bracket and a contact arm connected to the rotating arm, the contact arm being configured to trigger the switch; and
- the bracket has a groove, the contact arm being at least partially located in the groove.

7. The household appliance according to claim 6, wherein:
- the driving lever comprises a first arm and a second arm spaced apart from each other, during closing of the door body, the door hook being abutted against the first arm after moving under the second arm, to drive the driving lever to rotate;
- the contact arm is provided with a protruding post; and
- the first arm has a notch,
- wherein during the closing of the door body, the first arm avoids the protruding post by means of the notch.

8. The household appliance according to claim 6, wherein the bracket is further provided with a block blocking at least a part of the rotating arm.

9. The household appliance according to claim 1, wherein:
- the door hook has a first guide surface at an end of the door hook; and
- the driving lever comprises a first arm and a second arm spaced apart from each other, the second arm having a second guide surface at a side of the second arm,
- wherein during the closing of the door body, the first guide surface is cooperatively connected to the second guide surface, and the door hook is caught by the second arm after the end of the door hook moves through the second arm.

10. A household appliance, comprising:
- a door body provided with a door hook;
- a bracket connected to the door body through rotating; and
- a buffer assembly mounted at the bracket and comprising a restorable damper and a driving lever rotatably connected to the bracket, the damper comprising a body fixed at the bracket and a rod movably connected to the body, wherein:
- in response to the door body being close, the door hook is abutted against the driving lever to press the rod;
- in response to the door body being open, the door hook is disengaged from the driving lever, the damper is in a natural length state, and a gap is formed between the rod and the driving lever;
- the bracket is provided with a switch;
- the buffer assembly further comprises a rotating lever rotatably connected to the bracket; and
- in response to the door body being close, the switch is triggered by the rotating lever through abutting the door hook against the rotating lever.

11. The household appliance according to claim 10, wherein the bracket has a receiving groove, the body being at least partially fixed at the receiving groove.

12. The household appliance according to claim 10, wherein the bracket is provided with a limit post, in response to the door body being close, the limit post being abutted against the driving lever and limits a rotation of the driving lever.

13. The household appliance according to claim 10, wherein:

the rotating lever comprises a rotating arm rotatably connected to the bracket and a contact arm connected to the rotating arm;

the bracket has a groove, the contact arm being at least partially located in the groove; and the contact arm is configured to trigger the switch.

14. The household appliance according to claim 13, wherein:

the driving lever comprises a first arm and a second arm spaced apart from each other, during closing of the door body, the door hook being abutted against the first arm after moving through the second arm under the second arm, to drive the driving lever to rotate;

the contact arm is provided with a protruding post; and the first arm has a notch, wherein during the closing of the door body, the first arm avoids the protruding post by means of the notch.

15. The household appliance according to claim 13, wherein the bracket is further provided with a block blocking at least a part of the rotating arm.

16. The household appliance according to claim 15, wherein the block has an inclined surface at a top surface of the block, wherein during the closing of the door body, the inclined surface guides the door hook to be abutted against the contact arm.

17. The household appliance according to claim 10, wherein:

the door hook comprises a lower door hook;

the bracket is provided with a first switch; and the switch comprises a second switch and a third switch, wherein during the closing of the door body, the driving lever of the buffer assembly triggers the first switch under driving of the lower door hook, and then the rotating lever of the buffer assembly sequentially triggers the second switch and the third switch under driving of the lower door hook.

18. The household appliance according to claim 10, wherein:

the door hook has a first guide surface at an end of the door hook; and the driving lever comprises a first arm and a second arm spaced apart from each other, the second arm having a second guide surface at a side of the second arm, wherein during the closing of the door body, the first guide surface is cooperatively connected to the second guide surface, and the door hook is caught by the second arm after the end of the door hook moves through the second arm.

* * * * *